US011856989B2

(12) United States Patent
Zhang

(10) Patent No.: US 11,856,989 B2
(45) Date of Patent: Jan. 2, 2024

(54) ATOMIZING STRUCTURAL MEMBER, ATOMIZING DEVICE AND AEROSOL GENERATING DEVICE

(71) Applicant: Shenzhen Damai Development Co., Ltd., Guangdong (CN)

(72) Inventor: Chunhua Zhang, Guangdong (CN)

(73) Assignee: Shenzhen Damai Development Co., Ltd., Shenzhen (CN)

( * ) Notice: Subject to any disclaimer, the term of this patent is extended or adjusted under 35 U.S.C. 154(b) by 0 days.

(21) Appl. No.: 17/585,542

(22) Filed: Jan. 26, 2022

(65) Prior Publication Data

US 2023/0148666 A1 May 18, 2023

(30) Foreign Application Priority Data

Nov. 12, 2021 (CN) ......................... 202111342940.5

(51) Int. Cl.
*A24F 40/46* (2020.01)
*A24F 40/48* (2020.01)
(Continued)

(52) U.S. Cl.
CPC ................ *A24F 40/46* (2020.01); *A24F 7/02* (2013.01); *A24F 40/10* (2020.01); *A24F 40/42* (2020.01);
(Continued)

(58) Field of Classification Search
CPC .......... A24F 40/48; A24F 40/46; A24F 40/10; A24F 40/40
See application file for complete search history.

(56) References Cited

U.S. PATENT DOCUMENTS

2017/0215481 A1* 8/2017 Li ............................ H05B 3/42
2018/0140018 A1* 5/2018 Hu ........................... H05B 3/44
(Continued)

FOREIGN PATENT DOCUMENTS

CN 204444248 U 7/2015
CN 205266968 U 6/2016
(Continued)

OTHER PUBLICATIONS

1st Office Action of counterpart Chinese Patent Application No. 202111342940.5 dated Sep. 22, 2022.
(Continued)

*Primary Examiner* — Hae Moon Hyeon

(57) ABSTRACT

An atomizing structural member includes an atomizing core assembly and a heating element; the atomizing core assembly includes an atomizing portion and a liquid guiding portion, the heating element is embedded in the atomizing portion, and the atomizing portion is an article of porous material; the liquid guiding portion is arranged to be in contact with the atomizing portion, and the liquid guiding portion is used to deliver an atomizing medium to the atomizing portion; the atomizing portion has an inner wall and an outer wall, the inner wall forms a first atomizing face and a first air channel that delivers aerosol generated from the first atomizing face, the outer wall forms a second atomizing face, and the liquid guiding portion is provided with at least one opening to form a second air channel that delivers the aerosol generated from the second atomizing face.

15 Claims, 21 Drawing Sheets

(51) Int. Cl.

| | |
|---|---|
| ***A24F 40/10*** | (2020.01) |
| ***A24F 40/44*** | (2020.01) |
| ***A24F 40/42*** | (2020.01) |
| ***A24F 7/02*** | (2006.01) |
| ***H05B 3/06*** | (2006.01) |

(52) U.S. Cl.
CPC .............. *A24F 40/44* (2020.01); *A24F 40/48* (2020.01); *H05B 3/06* (2013.01); *H05B 2203/021* (2013.01)

(56) References Cited

U.S. PATENT DOCUMENTS

| | | | | |
|---|---|---|---|---|
| 2020/0120983 | A1* | 4/2020 | Chen | A24F 40/46 |
| 2022/0053827 | A1* | 2/2022 | Xu | A24F 40/46 |
| 2022/0110364 | A1* | 4/2022 | Li | A24F 40/42 |
| 2022/0273034 | A1* | 9/2022 | Rado | A24F 40/44 |
| 2022/0287365 | A1* | 9/2022 | Alsayar | A24F 40/46 |

FOREIGN PATENT DOCUMENTS

| | | | |
|---|---|---|---|
| CN | 206534128 | U | 10/2017 |
| CN | 110419779 | A | 11/2019 |
| CN | 210184516 | U | 3/2020 |
| WO | 2018113669 | A1 | 6/2018 |

OTHER PUBLICATIONS

Notice of Allowance of counterpart Chinese Patent Application No. 202111342940.5 dated Nov. 3, 2022.

* cited by examiner

ATOMIZING STRUCTURAL MEMBER, ATOMIZING DEVICE AND AEROSOL GENERATING DEVICE

CROSS REFERENCE TO RELATED APPLICATIONS

The present application claims the benefit of Chinese Patent Application No. 202111342940.5 filed on Nov. 12, 2021, the contents of which are incorporated herein by reference in their entirety.

TECHNICAL FIELD

The present application relates to the field of atomization technology, and in particular to an atomizing structural member, an atomizing device and an aerosol generating device.

BACKGROUND TECHNOLOGY

Traditional electronic atomizing devices are mainly composed of an atomizer and a power supply component. The atomizer generally includes a liquid-storing chamber and an atomizing component. The liquid-storing chamber is used to store a medium that can be atomized, and the atomizing component is used to heat and atomize the medium to form an inhalable aerosol. The power supply component is used to provide power to the atomizing component.

However, due to the design problem of the atomization position of these traditional electronic atomizing devices, this leads to a small amount of atomized smoke and the problem of poor consistency.

SUMMARY

On this basis, it is necessary to provide an atomizing structural member, an atomizing device and an aerosol generating device.

An atomizing structural member may include an atomizing core assembly and a heating element;

- the atomizing core assembly may include an atomizing portion and a liquid guiding portion, wherein the heating element is embedded in the atomizing portion, and the atomizing portion is an article of porous material;
- the liquid guiding portion is arranged to be in contact with the atomizing portion, and the liquid guiding portion is used to deliver an atomizing medium to the atomizing portion;
- the atomizing portion has an inner wall and an outer wall, the inner wall forms a first atomizing face and a first air channel that delivers aerosol generated from the first atomizing face, the outer wall forms a second atomizing face, and the liquid guiding portion is provided with at least one opening to form a second air channel that delivers the aerosol generated from the second atomizing face.

The above-mentioned atomizing structural member is an ingenious design of the structure of the atomizing portion. In one aspect, two atomizing faces are formed on the inner wall and the outer wall respectively. Since the two atomizing faces can undergo atomization reaction and generate aerosol respectively, it has the advantage of generation of a large amount of atomized aerosol; in another aspect, the atomizing portion indirectly contacts the atomizing medium that has not been atomized in the liquid storing chamber through the liquid guiding portion, so there is a relatively long distance from the atomizing medium in the liquid storing chamber, this can avoid deterioration of the atomizing medium in the liquid storing chamber by the high temperature; in a further aspect, due to the use of the liquid guiding portion to deliver the atomizing medium to the atomizing portion, it has the advantage of stable delivery, thereby ensuring the stability of atomization and ensuring the consistency of the atomized aerosol.

In one of the embodiments, the heating element is provided between the inner wall and the outer wall, and the heating element is spaced apart from both the inner wall and the outer wall.

In one of the embodiments, the heating element is a resistance heating element.

In one of the embodiments, the heating element includes a filament structure, a tubular structure, a spiral structure, a mesh structure, a sheet structure and a thick film structure.

In one of the embodiments, the heating element has a uniform shape, and the heating element is equally spaced apart from both the inner wall and the outer wall, so that the heating element has a uniform heating effect on the first atomizing face and the second atomizing face.

In one of the embodiments, the liquid guiding portion and the atomizing portion are of an integral structure; and/or

- a contacting position of the liquid guiding portion and the atomizing portion is located in a central region of the outer wall, so that the atomizing medium is evenly delivered to both ends of the atomizing portion.

In one of the embodiments, the opening and the outer wall together form the second air channel.

In one of the embodiments, the first air channel and the second air channel both communicate with a main air channel for output.

In one of the embodiments, the atomizing structural member further includes a ventilation tube, wherein a main air channel of the ventilation tube is in fluid communication with the first air channel, and the main air channel is at least partially in fluid communication with the second air channel.

In one of the embodiments, the ventilation tube is provided with a positioning groove, the positioning groove is used to cooperate with positioning and mounting of a suction nozzle structural member or a suction nozzle sealing sleeve of the suction nozzle structural member.

In one of the embodiments, the liquid guiding portion is provided with a liquid absorbing face in contact with the atomizing medium, and the liquid absorbing face is used to deliver the atomizing medium to the atomizing portion through an interior of the liquid guiding portion.

In one of the embodiments, an atomizing device includes a liquid-storing structural member and any one of the atomizing structural members;

- wherein the liquid-storing structural member is provided with a liquid storing chamber for accommodating the atomizing medium, and the liquid guiding portion is arranged to be in contact with the atomizing medium in the liquid storing chamber.

In one of the embodiments, the atomizing structural member further includes a sealing upper cover, the sealing upper cover is formed with a through hole and at least one liquid inlet, the sealing upper cover individually seals the liquid storing chamber or cooperates with the suction nozzle structural member to jointly seal the liquid storing chamber, so that the atomizing medium in the liquid storing chamber contacts the liquid guiding portion only through the liquid inlet, and the through hole is used for passing through of the ventilation tube of the atomizing structural member.

In one of the embodiments, the atomizing structural member further includes a base, a fixed end of the base abuts against the liquid-storing structural member and the atomizing portion or the sealing upper cover, so as to cooperate with mounting of the atomizing core assembly or the atomizing portion of the atomizing core assembly, a connecting end of the base is used for mounting of a power source; the base is formed with an air inlet, and the air inlet is in fluid communication with the first air channel and the second air channel.

In one of the embodiments, the atomizing structural member further includes an electrode assembly, the electrode assembly is connected with the heating element, and the electrode assembly is used to connect with the power source.

In one of the embodiments, the atomizing structural member further includes a mounting member, and the mounting member cooperates with the base to jointly fix the electrode assembly.

In one of the embodiments, the atomizing device further includes a suction nozzle structural member, the suction nozzle structural member is in fluid communication with the first air channel and the second air channel, or the suction nozzle structural member is in fluid communication with the main air channel of the ventilation tube of the atomizing structural member.

In one of the embodiments, an aerosol generating device includes a power source and any one of the atomizing devices, wherein the power source is connected with the atomizing device for power supply.

DESCRIPTION OF DRAWINGS

In order to more clearly illustrate the technical solutions in the embodiments of the present application or in the traditional technology, the following briefly introduces the accompanying drawings that need to be used in the description of the embodiments or the traditional technology. Obviously, the drawings in the following description are only for some embodiments of the application. For those of ordinary skill in the art, other drawings can also be obtained based on these drawings without any creative effort.

Figure 1:
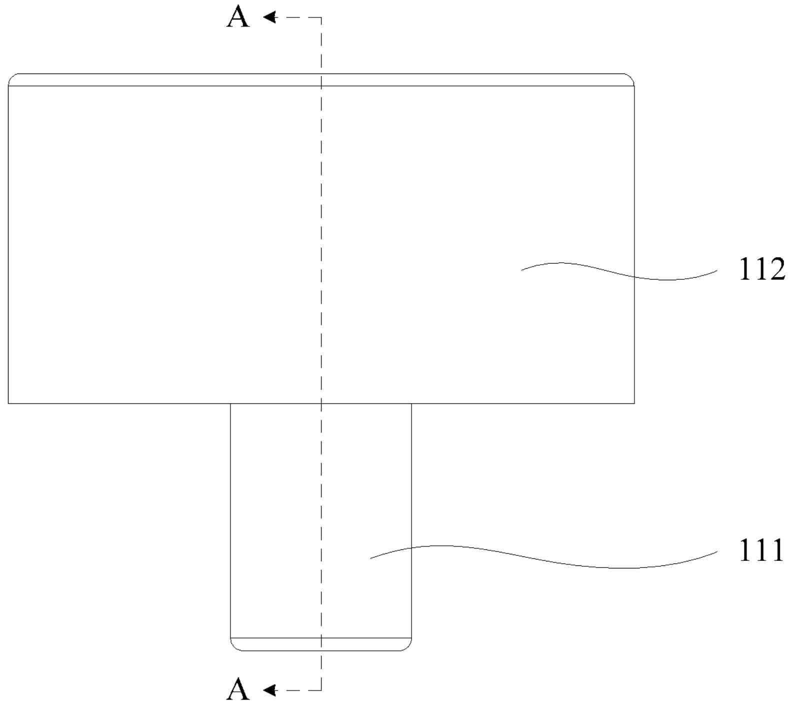
FIG. 1 is a schematic structural diagram of an atomizing core assembly of the atomizing structural member according to an embodiment in the present application.

Reference signs: atomizing structural member 100, liquid-storing structural member 200, suction nozzle structural member 300; atomizing core assembly 110, heating element 120, sealing upper cover 130, electrode assembly 140, ventilation tube 150, mounting member 160, base 170, base sleeve 180, air channel 190; atomizing portion 111, liquid guiding portion 112, mounting region 113, inner wall 114, outer wall 115, first end 116, second end 117, leak-proof sealing layer 118, liquid absorbing face 119, wall portion 112A, cup bottom 112B, liquid inlet 131, through hole 132, sealing protrusion 133, accommodating cavity 134, electrode core 141, electrode pressing piece 142, electrode seat 143, electrode sealing sleeve 144, insulating wiring tube 145, positioning groove 151, air inlet 171, fixed end 172, connecting end 173, first air channel 191, second air channel 192, main air channel 193, first outer tube 210, second outer tube 220, liquid storing structure 230, sealing groove 231, liquid storing chamber 240, suction nozzle 310, opening 311, sealing plug 320, suction nozzle sealing sleeve 330, positioning protrusion 331, suction nozzle inner tube 340.

DETAILED DESCRIPTION OF EMBODIMENTS

In order to make the above objects, features and advantages of the present application more clearly understood, the specific embodiments of the present application will be described in detail below with reference to the accompanying drawings. In the following description, numerous specific details are set forth in order to provide a thorough understanding of the present application. However, the present application can be implemented in many other ways different from those described herein, and those skilled in the art can make similar improvements without departing from the intention of the present application. Therefore, the present application is not limited by the specific embodiments disclosed below.

It should be noted that when a component is referred to as being "fixed to" or "provided on" another component, it can be directly on the other component or there may also be an intervening component. When a component is considered to be “connected” to another component, it is directly connected to the other component or there is an intervening component. The terms “vertical”, “horizontal”, “upper”, “lower”, “left”, “right” and similar expressions used in the specification of this application are for illustrative purposes only and do not represent the only way of implementation.

In addition, the terms “first” and “second” are only used for descriptive purposes, and should not be construed as indicating or implying relative importance or implying the number of the indicated technical features. Thus, a feature denoted with “first”, “second” may expressly or implicitly include at least one of that feature. In the description of the present application, “plurality” means at least two, such as two, three, etc., unless expressly and specifically defined otherwise.

In this application, unless otherwise expressly specified and defined, a first feature “on” or “under” a second feature means that the first feature directly contacts the second feature, or the first feature indirectly contacts the second feature through a middle feature. Also, a first feature is “over” or “above” or “on top of” a second feature means that the first feature is directly above or obliquely above the second feature, or simply means that the level of the first feature is higher than that of the second feature. A first feature “below” or “under” or “underneath” a second feature means that the first feature is directly below or obliquely below the second feature, or simply means that the level of the first feature is lower than that of the second feature.

Unless otherwise defined, all technical and scientific terms used in the specification of this application have the same meaning as commonly understood by one of ordinary skill in the technical field to which this application belongs. The terms used in the specification of the present application are for the purpose of describing specific embodiments only, and are not intended to limit the present application. As used in this specification, the term “and/or” includes any and all combinations of one or more of the associated listed items.

Figure 2:
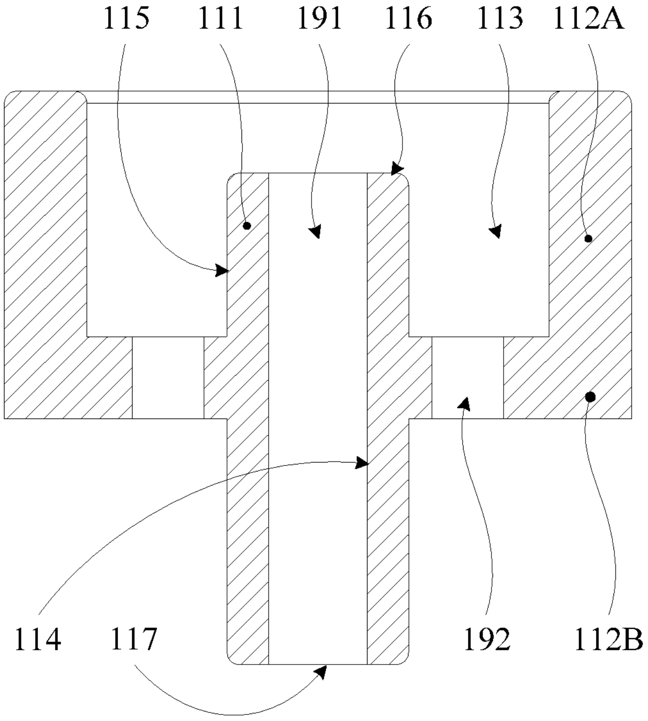
FIG. 2 is a schematic cross-sectional view along the A-A direction of the embodiment shown in FIG. 1.

The present application discloses an atomizing structural member which may include some or all of the structures of the following embodiments. In one of the embodiments, an atomizing core assembly of an atomizing structural member is shown in FIG. 1, which may include an atomizing portion 111 and a liquid guiding portion 112, the liquid guiding portion 112 may be arranged in contact with the atomizing portion 111, the liquid guiding portion 112 may be used to deliver an atomizing medium to the atomizing portion 111. Further, in one of the embodiments shown in FIG. 2, the atomizing portion 111 may have a cylindrical shape. Further, the atomizing portion 111 may be made of a porous material with a hollow structure, which can also be called a hollow porous body. Further, the pore diameter of the porous material may be 100 nm to 120 μm; in one of the embodiments, the pore diameter of the porous material may be 1 μm to 100 μm. In one of the embodiments, the porous material has a pore diameter of 10 μm to 50 μm. In one of the embodiments, the liquid guiding portion 112 may be made of the same material as the atomizing portion 111. The material of the porous material may be ceramic or glass. In one of the embodiments, the internal porosity of the porous material may be 30% to 90%, and in one of the embodiments, the internal porosity of the porous material may be 50% to 65%.

Referring to FIG. 2 again, the atomizing portion 111 of the atomizing core assembly may have an inner wall 114 and an outer wall 115, the inner wall 114 forms a first atomizing face and a first air channel 191 for delivering the aerosol generated from the first atomizing face, the outer wall 115 forms a second atomizing face, the liquid guiding portion 112 may be provided with at least one opening that forms at least one second air channel 192 for delivering the aerosol generated from the second atomizing face. It can be understood that, in this embodiment, the atomizing portion 111 may be made of a porous material, which may be used to transfer the atomizing medium delivered from the liquid guiding portion 112 to the first end 116 of the atomizing portion 111 by overcoming the gravitational factor through capillary action, and transfer to the second end 117 of the atomizing portion 111 by capillary action as well as gravitational force. In one of the embodiments, the contacting position of the liquid guiding portion 112 and the atomizing portion 111 may be located in a central region of an outer wall 115 of the atomizing portion 111, so as to evenly deliver the atomizing medium to both ends of the atomizing portion 111; in one of the embodiments, the contacting position of the liquid guiding portion 112 and the atomizing portion 111 may be located in a force balance region of the outer wall 115 of the atomizing portion 111, the force balance region is a balance region of the capillary force and the gravitational force, so that the atomizing medium can be evenly delivered to the first end 116 and the second end 117 of the atomizing portion 111 under the capillary action and the gravitational action. Such a design is advantageous in ensuring the stability of atomization, thereby ensuring consistency of the atomized aerosol.

Further, in this embodiment, the contacting position of liquid guiding portion 112 and the atomizing portion 111, i.e., the connecting faces of the two, may be located at a central region of the outer wall 115, and may divide the outer wall 115 into an upper end and a lower end, i.e., an upper end region and a lower end region are formed, in order to deliver the aerosol generated from the upper end and the lower end, the liquid guiding portion 112 may be provided with an opening that can communicate the upper end with the lower end to achieve fluid communication, there may be one or more openings, in order to improve the delivery efficiency, the opening can be formed on the connecting faces where the liquid guiding portion 112 and the outer wall 115 are connected, i.e., the opening and the outer wall 115 form the second air channel 192. In order to enable the atomizing medium to be smoothly delivered from the liquid guiding portion 112 to the atomizing portion 111, the liquid guiding face of the liquid guiding portion 112, i.e., the liquid absorbing face, may have a level that is higher than that of the connecting faces of the liquid guiding portion 112 and the atomizing portion 111.

Further, in this embodiment, a mounting region 113 may be formed between the atomizing portion 111 and the liquid guiding portion 112 of the atomizing core assembly, the mounting region 113 may be used to facilitate mounting of other structures, such as a sealing upper cover and/or a ventilation tube, so as to fix the atomizing core assembly and/or a liquid storing chamber in which the atomizing medium is sealed and stored.

Further, in one of the embodiments, the liquid guiding portion 112 may be provided with a wall portion 112A, the wall portion 112A may be arranged in contact with the atomizing portion 111, and the wall portion 112A may be used to contact with the atomizing medium and the atomizing medium may be delivered to the atomizing portion 111. In a state of use, the wall portion 112A may have a position that is higher than the atomizing portion 111 in the direction of gravity. For the embodiment with the wall portion 112A, the opening of the liquid guiding portion 112 may be formed in the wall portion 112A, further, in one of the embodiments, at least one opening may be provided at a contacting position of the wall portion 112A and the atomizing portion 111, so that the upper end region and the lower end region of the opening are in fluid communication; and/or, the wall portion 112A may be provided with at least one opening at a position adjacent to the atomizing portion 111, so that the upper and lower end regions of the opening are in fluid communication.

Further, in one of the embodiments, referring to FIG. 2 again, the liquid guiding portion 112 has a cup-shaped structure, and the cup-shaped structure may be provided with the wall portion 112A and a connecting cup bottom 112B, the cup bottom 112B may be arranged to be in contact with the atomizing portion 111, the wall portion 112A may be used for contacting with the atomizing medium, and the atomizing medium may be delivered to the atomizing portion 111 through the cup bottom 112B. For the embodiment with the cup bottom 112B, the opening of the liquid guiding portion 112 may be formed in the cup bottom 112B. In one of the embodiments, the cup bottom 112B may be provided with at least one opening at its contacting position with the atomizing portion 111, so that the upper end region and the lower end region of the opening are in fluid communication; and/or, the cup bottom 112B may be provided with at least one opening at a position adjacent to the atomizing portion 111, so that the upper end region and the lower end region of the opening are in fluid communication, forming the second air channel 192; and/or, the wall portion 112A and the cup bottom 112B form an included angle greater than or equal to 90 degrees; and/or the cup bottom 112B may be in a regular shape with a centre, and the atomizing portion 111 may be located at a central region of the cup bottom 112B. In the embodiment shown in FIG. 2, the wall portion 112A and the cup bottom 112B form an included angle of 90 degrees.

Figure 3:
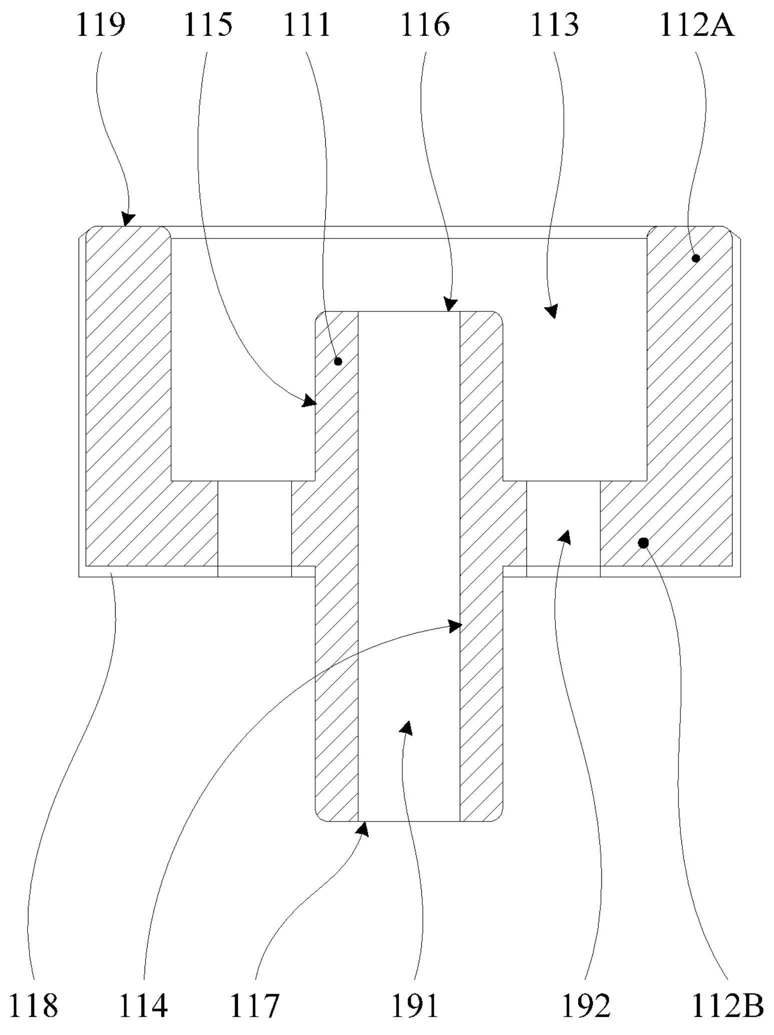
FIG. 3 is a schematic cross-sectional view of an atomizing core assembly of the atomizing structural member according to another embodiment in the present application.

In one of the embodiments, the liquid guiding portion 112 may be provided with a liquid absorbing face 119 which is in contact with the atomizing medium, the level of the liquid absorbing face 119 may be higher than that of the connecting faces, so as to improve the delivery efficiency of the atomizing medium, in one of the embodiments as shown in FIG. 3, the liquid guiding portion 112 may be provided with a liquid absorbing face 119 which is in contact with the atomizing medium, the liquid absorbing face 119 may be used to transfer the atomizing medium to the atomizing portion 111 through the liquid guiding portion 112. For the porous material, the liquid absorbing face 119 delivers the atomizing medium from the interior of the liquid guiding portion 112 to the atomizing portion 111 through capillary action. In one of the embodiments, the wall portion 112A may be provided with the liquid absorbing face 119 which is in contact with the atomizing medium, and in a state of use, the liquid absorbing face 119 may be higher than a contacting position of the liquid guiding portion 112 and the atomizing portion 111 in the direction of gravity, i.e., when the atomizing core assembly is in use, the liquid absorbing face 119 contacts the atomizing medium in the liquid storing chamber, and in the direction of gravity, the contacting position of the liquid guiding portion 112 and the atomizing portion 111 may be lower than the liquid absorbing face 119, so that the liquid absorbing face 119 can deliver the atomizing medium to the atomizing portion 111 through the liquid guiding portion 112. In one of the embodiments, the highest position of the wall portion 112A may be provided with the liquid absorbing face 119 which is in contact with the atomizing medium, in the state of use, all of the liquid absorbing face 19 may be higher than the first end 116 in the direction of gravity.

When the pores of the porous material are small, the capillary action may be more significant than the gravitational action, in one of the embodiments, in the state of use, the highest position of the atomizing portion 111 in the direction of gravity may be lower than the highest position of the wall portion 112A to which the atomizing medium is delivered by capillary force, i.e., the first end 116 may be higher than the highest position of the wall portion 112A, e.g., the liquid absorbing face 119, it only needs to be able to deliver the atomizing medium to the first end 116 by capillary force.

Further, in one of the embodiments, the wall portion 112A may be provided with a flow guiding channel arranged in contact with the liquid absorbing face 119 and the atomizing portion 111 respectively, or the liquid guiding portion 112 and the atomizing portion 111 may be of an integral structure, so that the atomizing medium may be delivered to the atomizing portion 111 through the interior of the liquid guiding portion 112. In one of the embodiments, the liquid guiding portion 112 and the atomizing portion 111 are of an integral structure, and the connecting faces of the liquid guiding portion 112 and the atomizing portion 111 may be located in a central region of the outer wall 115 to ensure that cigarette oil can be evenly distributed to various regions of the atomizing portion 111.

Further, in one of the embodiments, referring to FIG. 3 again, the atomizing core assembly 110 may be provided with a leak-proof sealing layer 118 at the liquid guiding portion 112, and the leak-proof sealing layer 118 may be used to prevent the atomizing medium from leaking out of the liquid guiding portion 112; the leak-proof sealing layer 118 may be provided at the liquid guiding portion 112 except for the liquid absorbing face 119 and the contacting position; in one of the embodiments, the leak-proof sealing layer 118 may be only disposed on the cup bottom 112B. Further, in one of the embodiments, the leak-proof sealing layer 118 may be a coating or a lamella.

Figure 4:
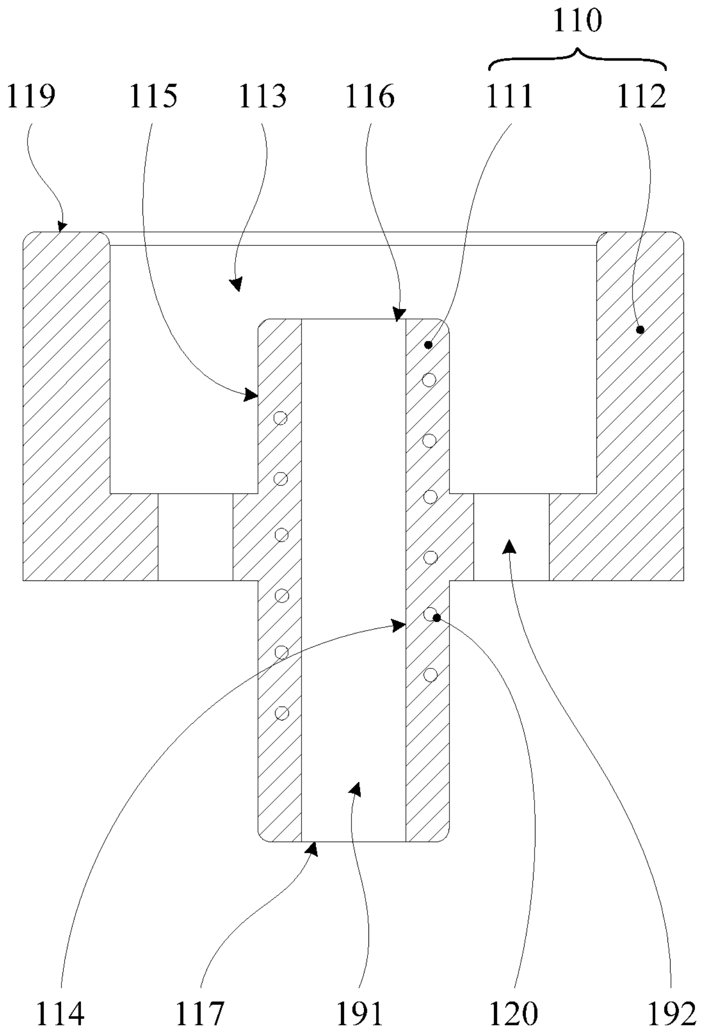
FIG. 4 is a schematic cross-sectional view of the atomizing structural member according to another embodiment of the present application.

In one of the embodiments, the atomizing structural member shown in FIG. 4 may include an atomizing core assembly 110 and a heating element 120; the atomizing core assembly 110 may include the atomizing portion 111 and the liquid guiding portion 112, the heating element 120 may be embedded in the interior of the atomizing portion 111, and the atomizing portion 111 may be an article of porous material; the liquid guiding portion 112 may be arranged in contact with the atomizing portion 111, the liquid guiding portion 112 may be used to deliver an atomizing medium to the atomizing portion 111, i.e., the heating element may be embedded in the interior of the atomizing portion 111, and the liquid guiding portion 112 may be in contact with the atomizing portion 111 and may be used to deliver the atomizing medium to the atomizing portion 111.

Figure 5:
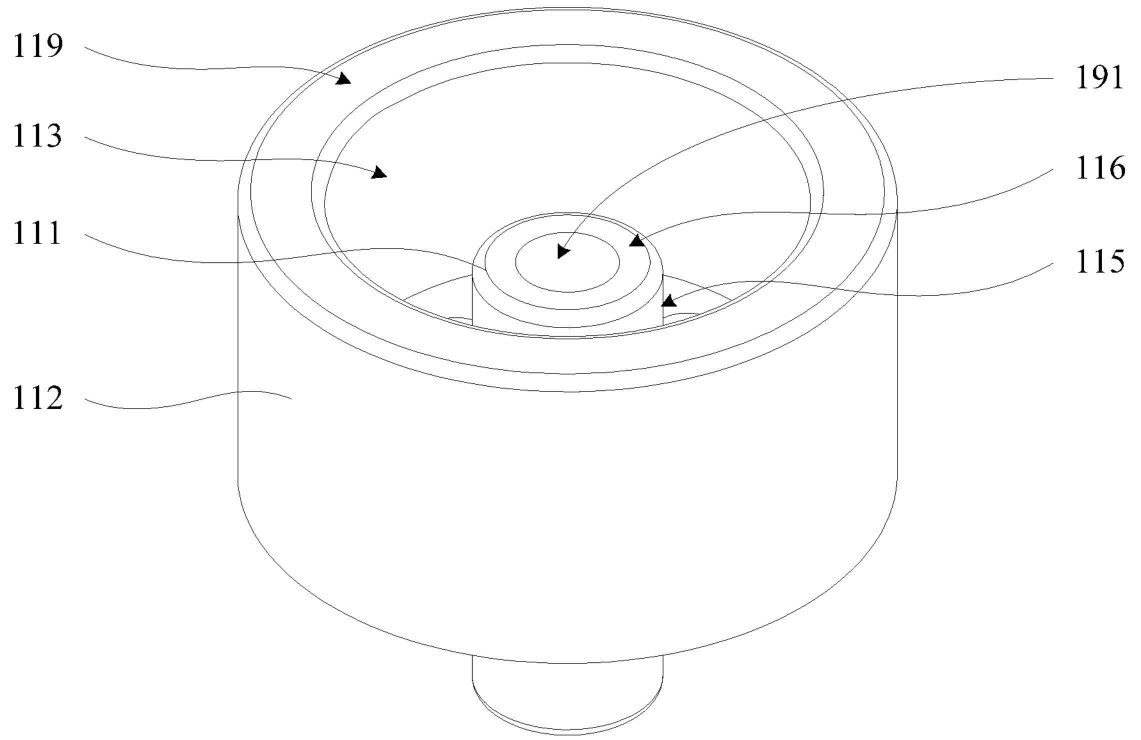
FIG. 5 is a schematic diagram of the embodiment shown in FIG. 4 from another direction.
Figure 6:
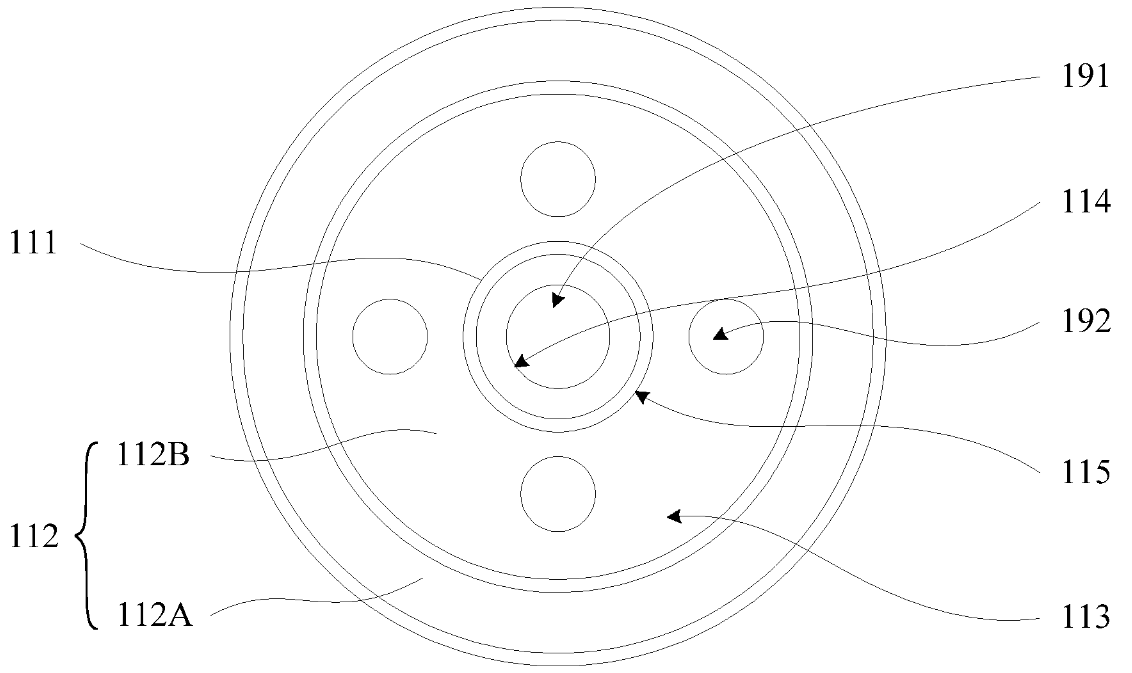
FIG. 6 is a schematic diagram of the embodiment shown in FIG. 5 from another direction.
Figure 7:
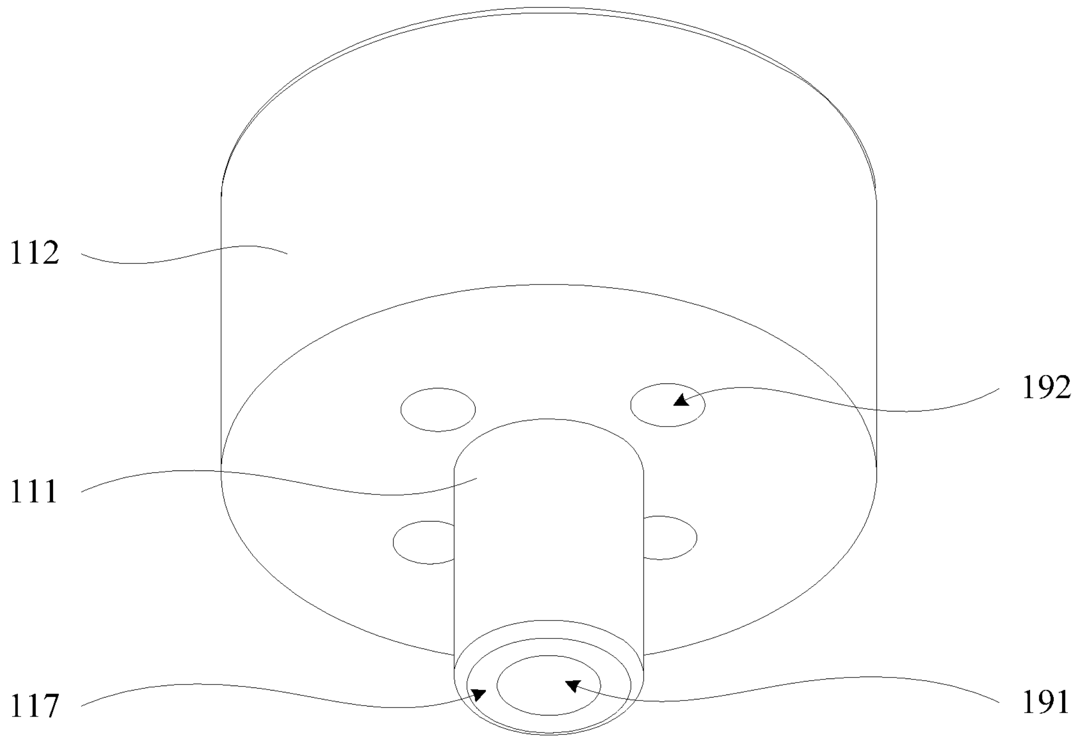
FIG. 7 is a schematic diagram of the embodiment shown in FIG. 4 from another direction.
Figure 8:
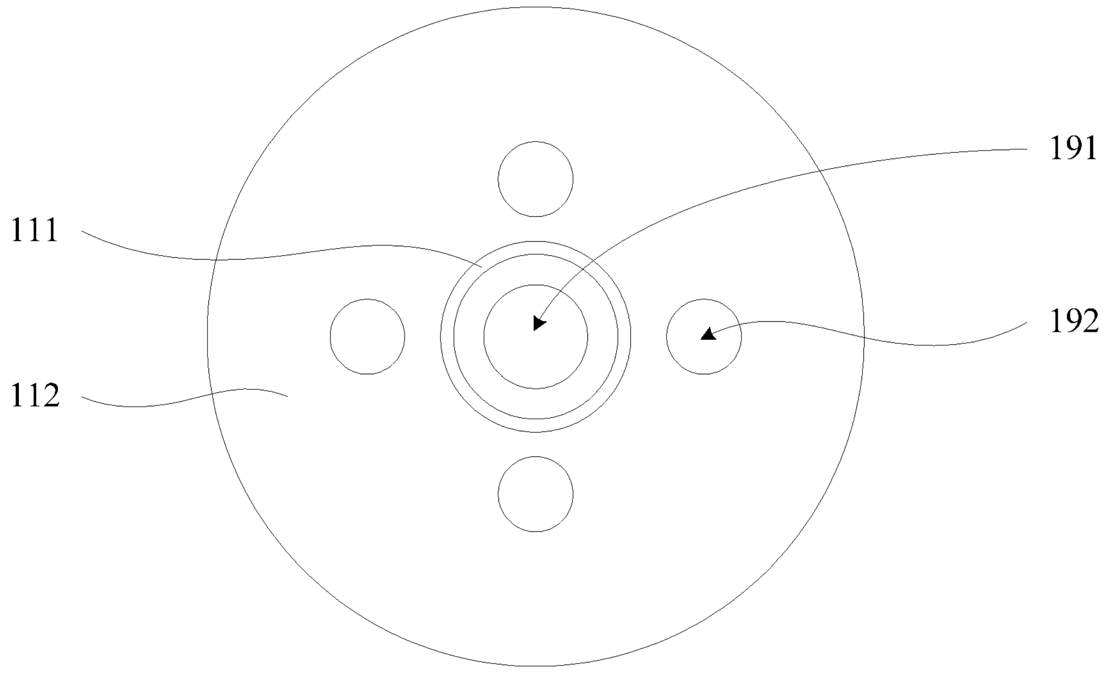
FIG. 8 is a schematic view of the embodiment shown in FIG. 7 from another direction.

Referring to FIG. 5 and FIG. 6, the atomizing portion 111 may have an inner wall 114 and an outer wall 115, through the action of the heating element 120, the inner wall 114 forms a first atomizing face and a first air channel 191 for delivering the aerosol generated from the first atomizing face, the outer wall 115 forms a second atomizing face, i.e., the inner wall 114 of the atomizing portion 111 cooperates with the heating element 120 to form the first atomizing face, and the outer wall 115 of the atomizing portion 111 cooperates with the heating element 120 to form the second atomizing face. In the embodiment shown in FIG. 6, the cup bottom 112B may be circular, i.e., one of the regular shapes with a centre, and the atomizing portion 111 may be located in a central region of the cup bottom 112B. Referring to FIG. 7 and FIG. 8, the liquid guiding portion 112 may be provided with at least one opening to form at least one second air channel 192 for delivering the aerosol generated from the second atomizing face. The shape and number of the opening are not limited, and the liquid guiding portion 112 may be evenly formed with at least three openings, and each of the openings may be circumferentially distributed. That is, the atomizing portion 111 may include an inner wall 114 and an outer wall 115, the inner wall 114 forms the first atomizing face and the first air channel 191 that delivers the aerosol generated from the first atomizing face, and the outer wall 115 forms a second atomizing face. The liquid guiding portion 112 may be provided with at least one opening to form at least one second air channel 192 that delivers the aerosol generated from the second atomizing face, and the second air channel 192 can have multiple sub-channels according to the number of the opening. The other embodiments are similar, and will not be repeated. The above-mentioned atomizing structural member is an ingenious design of the structure of the atomizing portion 111. In one aspect, two atomizing faces are formed on the inner wall and the outer wall respectively. Since the two atomizing faces can undergo atomization action and generate aerosol respectively, it has the advantage of generation of a large amount of atomized aerosol; in another aspect, the atomizing portion 111 indirectly contacts the atomizing medium that has not been atomized in the liquid storing chamber through the liquid guiding portion 112, so there is a relatively long distance from the atomizing medium in the liquid storing chamber, this can avoid deterioration of the atomizing medium in the liquid storing chamber by the high temperature. Further, in the case of avoiding the heating of the atomizing medium, it also has the following advantages: the atomizing medium is a fluid, and the fluid will change its adhesion when heated. The change of the adhesion will also affect the fluidity of the fluid, thereby affecting the efficiency of the capillary action of the liquid guiding portion 112, and changing the liquid flowing rate, so avoiding the heating of the atomizing medium can ensure uniformity of the flowing rate of the atomizing medium to a certain extent; in a further aspect, since the liquid guiding portion 112 is used to deliver the atomizing medium to the atomizing portion 111, it has the advantage of a stable amount of delivery, thereby ensuring the stability of atomization, with the avoidance of heating of the atomizing medium, it is beneficial to ensure the uniformity of delivery rate of the atomizing medium, thereby ensuring the consistency of the atomized aerosol.

In one of the embodiments, the heating element 120 may be a resistance heating element. The heating element 120 may be connected to an electrode assembly of the atomizing structural member, and when connected to a power source, it heats and atomizes the atomizing medium absorbed by the atomizing portion 111 to generate aerosol. Further, in one of the embodiments, the heating element 120 may be a resistance heating element, which may be made of a conductive material such as metal or alloy. Further, in one of the embodiments, the heating element 120 may be disposed between the inner wall 114 and the outer wall 115, and the heating element 120 may be spaced apart from the inner wall 114 and the outer wall 115. Further, in one of the embodiments, the heating element 120 may have a uniform shape and the heating element 120 may have the same interval with the inner wall 114 and the outer wall 115, so that the heating element 120 can have a uniform heating effect on the first atomizing face and the second atomizing face. That is, the heating element 120 has the same first distance with respect to the inner wall 114, the heating element 120 has the same second distance with respect to the outer wall 115, and the first distance may be equal to the second distance. The distance from the centreline of the longitudinal cross section of the heating element 120 to the outer wall 115 is the same as that to the inner wall 114, or the distance from an edge of the heating element 120 near the outer wall 115 to the outer wall 115 is the same as the distance from an edge of the heating element 120 near the inner wall 114 to the inner wall 114.

Figure 9:
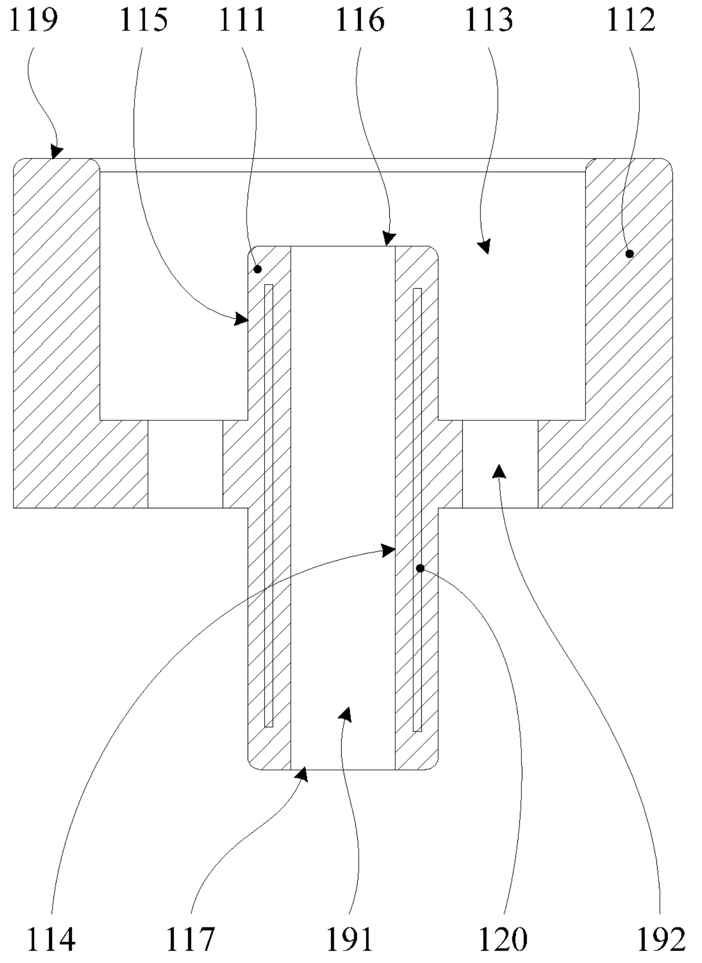
FIG. 9 is a schematic structural diagram of the atomizing structural member according to an embodiment in the present application.
Figure 20:
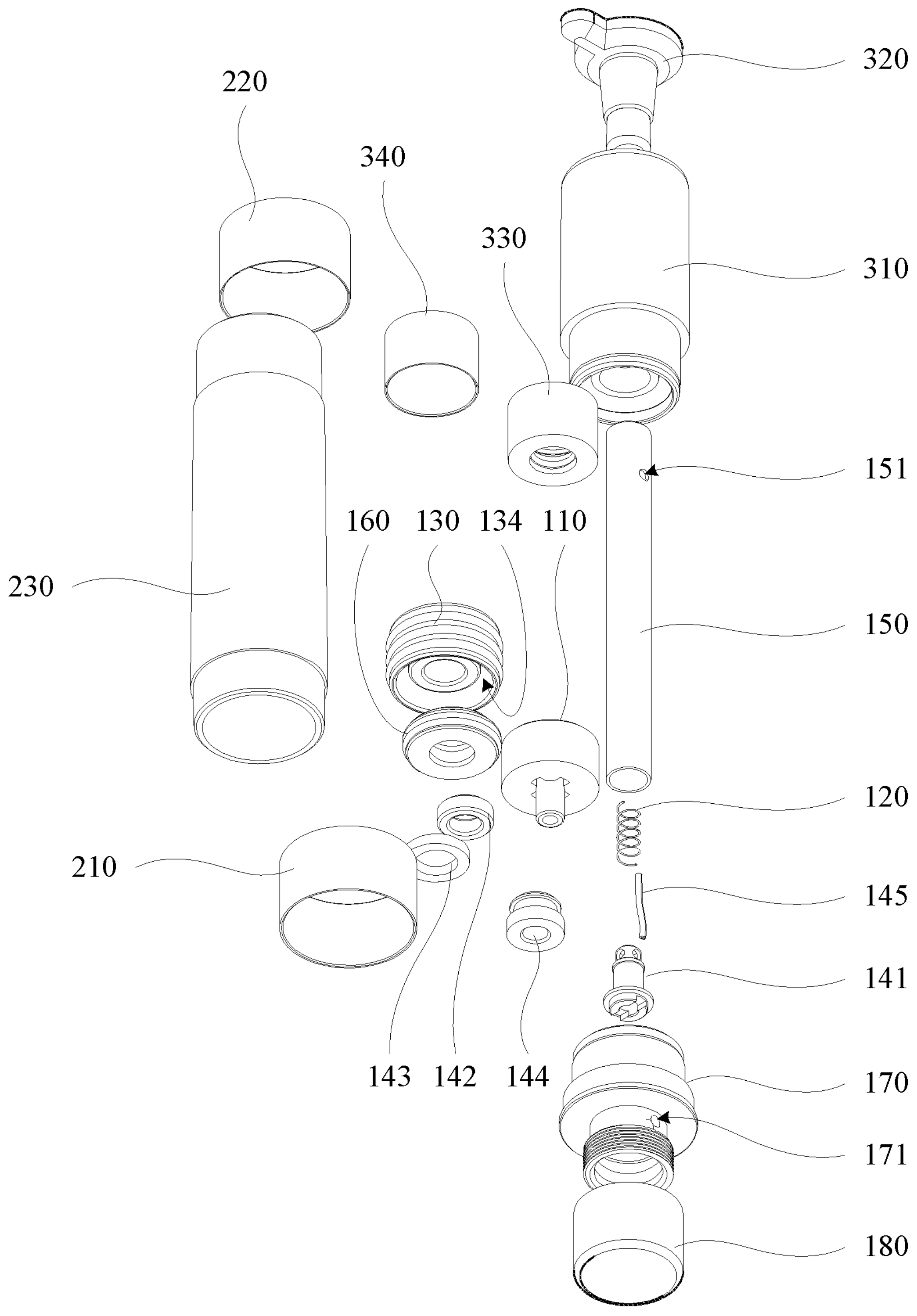
FIG. 20 is a further exploded schematic diagram of the embodiment shown in FIG. 10.

Further, in one of the embodiments, the heating element 120 may include a filament structure, a tubular structure, a spiral structure, a mesh structure, a sheet structure and a thick film structure; it is understood that the shape of the heating element 120 is not limited to these structures, as long as it can be placed evenly in the atomizing portion 111 to achieve a stable heating effect. In one of the embodiments, as shown in FIG. 4 and FIG. 20, the heating element 120 may have the shape of a spiral structure; in another embodiment, as shown in FIG. 9, the shape of the heating element 120 may be cylindrical or a straight strip. Further, in one of the embodiments, the heating element 120 may be embedded and disposed between the outer wall 115 and the inner wall 114 of the atomizing portion 111, and there may be a certain distance between them, so as to avoid powdering in the region where the wall thickness may be too thin when heating at high temperature, which may affect the atomization effect and even threaten the user's health. The liquid guiding portion 112 and the atomizing portion 111 may adopt an integrated design, and the liquid guiding portion 112 first delivers the atomizing medium to the outer wall 115 through the connecting faces, and then delivers it to the entire atomizing portion 111 by capillary action of ceramic, the atomizing medium saturation at the outer wall 115 may be relatively greater than the atomizing medium saturation at the inner wall 114, in order to have atomization at the inner wall 114 and the outer wall 115 at the same time, and maintain the consistency of the aerosol concentration, the heating element 120 may be placed in the middle of the outer wall 115 and the inner wall 114, or may be deviated towards an upper portion of the outer wall 115.

When in use, the heating element 120 may be located inside the atomizing portion 111 having a hollow porous body, and both the inner wall 114 and the outer wall 115 can form an atomizing face, and the integrated liquid guiding portion 112 can evenly transfer the atomizing medium, e.g. a type of oil or paste, into the atomizing portion 111, the aerosol generated from the inner wall 114 may be discharged through a middle air channel, i.e., the first air channel 191, and the aerosol generated from the outer wall 115 may be discharged through a number of peripheral channels, i.e., the second air channels 192, located between the liquid guiding portion 112 and the outer wall 115 of the atomizing portion 111. Since the two atomizing faces of the atomizing portion 111 have atomization action, this can effectively increase the amount of atomized aerosol and improve the user's suction experience; at the same time, there is a relatively long distance between the atomizing faces and the liquid absorbing face, this can avoid the deterioration of the atomizing medium in the liquid storing chamber caused by high temperature.

Figure 10:
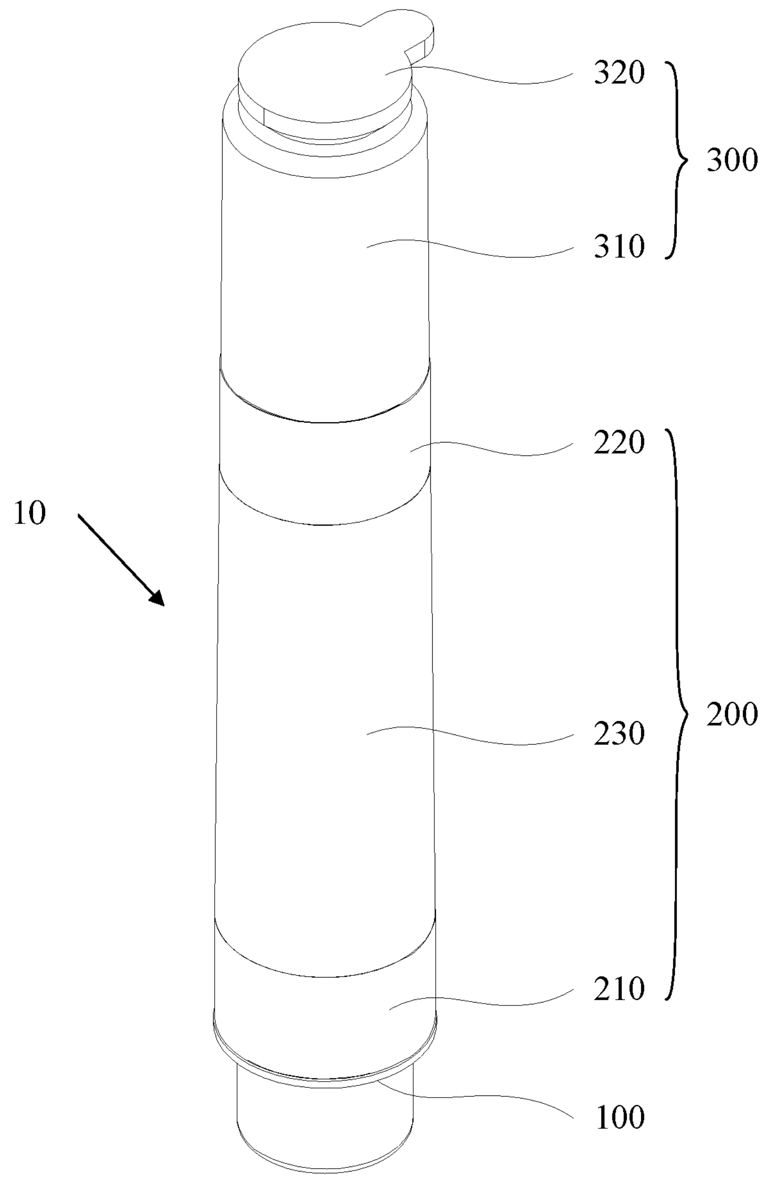
FIG. 10 is a schematic structural diagram of the atomizing device according to an embodiment in the present application.
Figure 12:
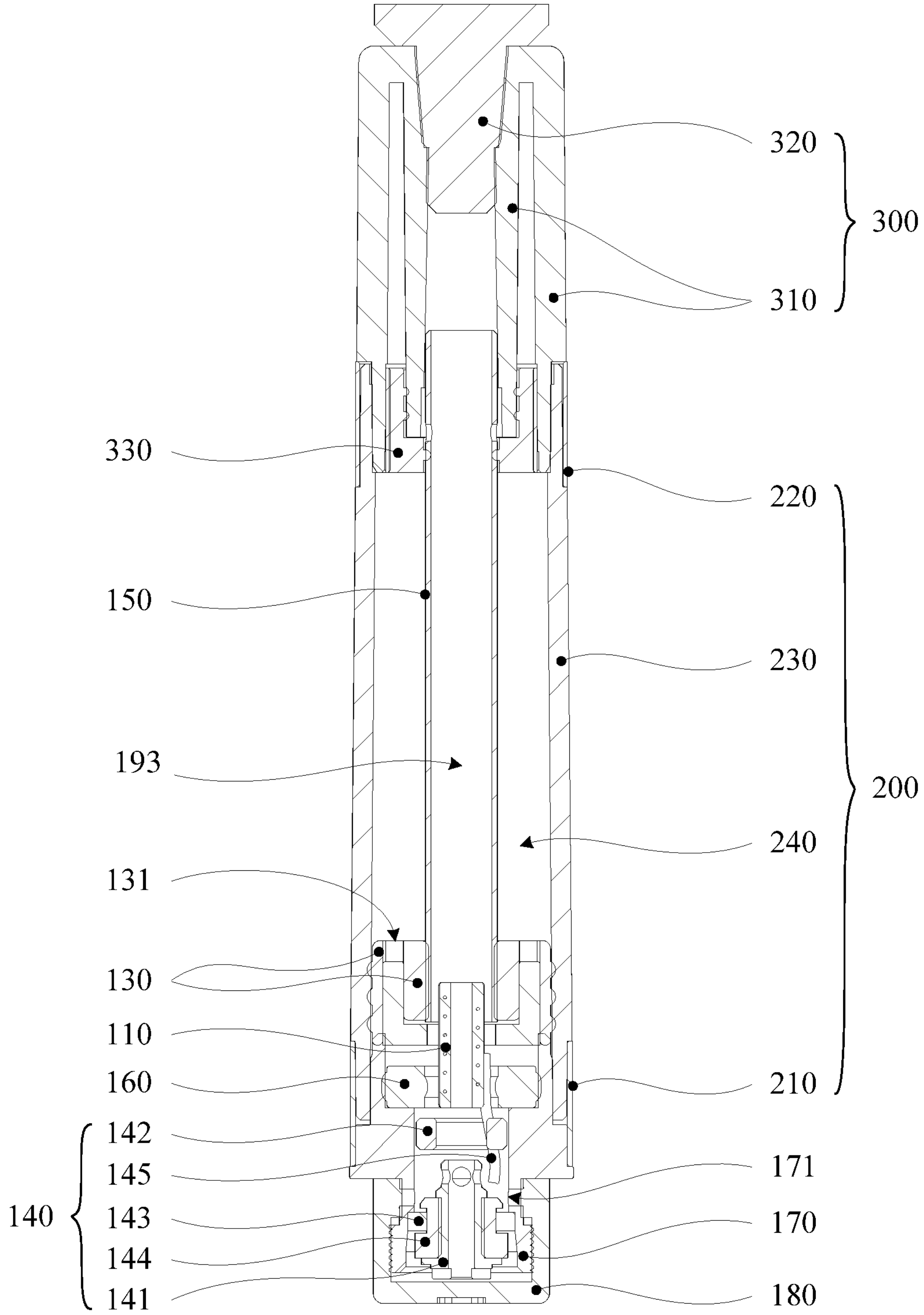
FIG. 12 is a schematic cross-sectional view along the B-B direction of the embodiment shown in FIG. 11.

In one of the embodiments, an atomizing device 10 shown in FIG. 10 may include a liquid-storing structural member 200 and the atomizing structural member 100 described in any of the embodiments; referring to FIG. 12, the liquid-storing structural member 200 may be provided with a liquid storing chamber 240 for accommodating the atomizing medium, and the liquid guiding portion 112 may be arranged to contact with the atomizing medium in the liquid storing chamber 240. In this embodiment, the atomizing device may further include a suction nozzle structural member 300. The suction nozzle structural member 300 may be disposed on the liquid-storing structural member 200, the liquid-storing structural member 200 may be disposed on the atomizing structural member 100, and the atomizing structural member 100 may be partially located in the liquid-storing structural member 200. In one of the embodiments, the suction nozzle structural member 300 may be in fluid communication with the aerosol generated by the atomizing portion 111, or the suction nozzle structural member 300 may be in fluid communication with the air channel 190. In this embodiment, the suction nozzle structural member 300 may be provided with a suction nozzle 310 and a sealing plug 320 detachably covering the suction nozzle 310; the liquid-storing structural member 200 may include a first outer tube 210, a second outer tube 220, and a liquid storing structure 230, one end of the liquid storing structure 230 may be tightly combined with the atomizing structural member 100 through the first outer tube 210, the other end of the liquid storing structure 230 may be tightly combined with the suction nozzle 310 through the second outer tube 220. In one of the embodiments, the suction nozzle structural member 300 or its suction nozzle 310 may be in fluid communication with the first air channel 191 and the second air channel 192, or the suction nozzle structural member 300 or its suction nozzle 310 may be in fluid communication with the main air channel 193 of the ventilation tube 150 of the atomizing structural member 100.

Figure 11:
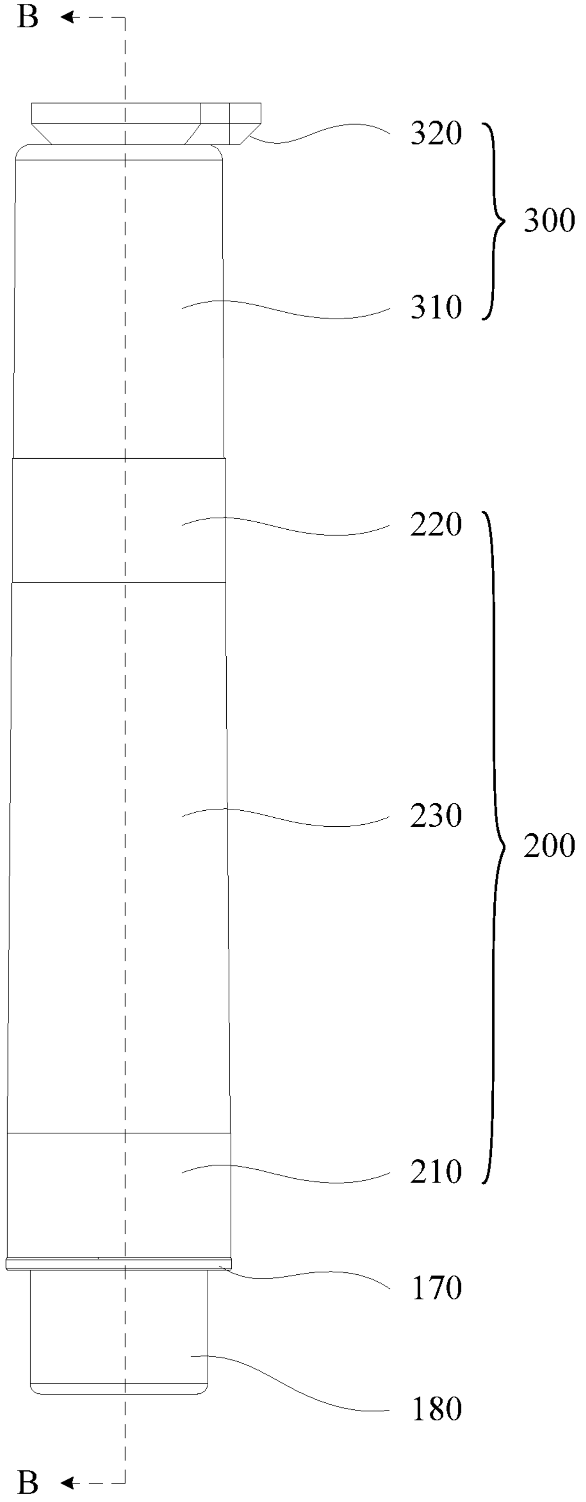
FIG. 11 is a schematic diagram of the embodiment shown in FIG. 10 from another direction.

Referring to FIG. 11, the atomizing structural member 100 may further include a base 170, the base 170 may be tightly coupled with one end of the liquid storing structure 230 through the first outer tube 210, and the connecting end of the base 170 may be located outside the liquid storing structure 230, a power source for supplying power to the atomizing structural member 100 may be provided to directly or indirectly realize power connection. In this embodiment, the atomizing structural member 100 may further include a base sleeve 180, the base sleeve 180 may be detachably mounted on the connecting end of the base 170, so as to protect the structures, such as the electrode assembly, etc., provided in the base 170 when the device is not in use, such as during a transportation state. Furthermore, for ease of use, the base sleeve 180 may be a silicone or rubber article, so that it can be quickly mounted on the connecting end of the base 170 or detached from the connecting end of the base 170, and the connecting end of the base 170 can be connected to the power source, e.g., a battery or its electrode connector, etc.

In each embodiment, the atomizing device may be further provided with an air inlet and an air outlet, and the air inlet may be in fluid communication with the first air channel 191 and the second air channel 192. The number of the air inlet may not be limited, for example, the atomizing device may include two air inlets, and the two air inlets may communicate with the first air channel 191 and the second air channel 192 respectively. The air outlet may be in fluid communication with the air channel 190 or the main air channel 193. For example, the air outlet may be in fluid communication with the main air channel 193 of the ventilation tube 150, so that aerosol can be discharged from the air outlet through the ventilation tube 150.

Figure 16:
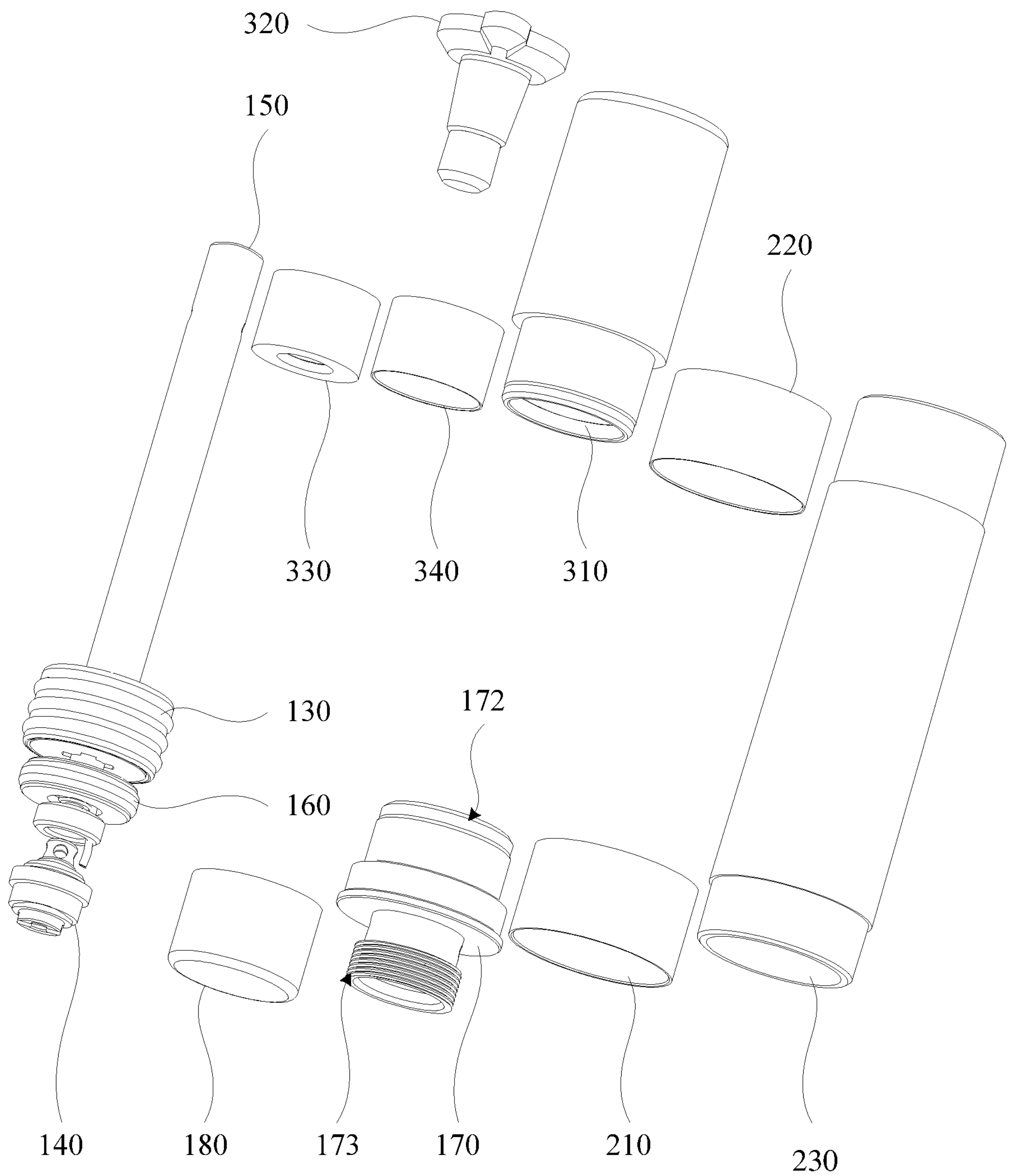
FIG. 16 is a schematic exploded view of the structure of the embodiment shown in FIG. 10 from another direction.

In one of the embodiments, the internal structure of the atomizing device is shown in FIG. 12. The atomizing structural member 100 may further include a ventilation tube 150, and the main air channel 193 of the ventilation tube 150 may be in fluid communication with the first air channel 191, and the main air channel 193 may be at least partially in fluid communication with the second air channel 192. In this embodiment, as shown in FIG. 16, the atomizing structural member 100 may further include a base 170, and a fixed end 172 of the base 170 may abut against the liquid-storing structural member 200 and the atomizing portion 111 or the sealing upper cover 130 of the atomizing structural member 100, so as to facilitate mounting of the atomizing structural member 100 or the atomizing portion 111, the connecting end 173 of the base 170 may be used for the mounting of a power source; in the present embodiment, the air inlet may be formed on the base 170; referring to FIG. 21, the base 170 may be formed with an air inlet 171, and the air inlet 171 may be in fluid communication with the first air channel 191 and the second air channel 192.

Figure 13:
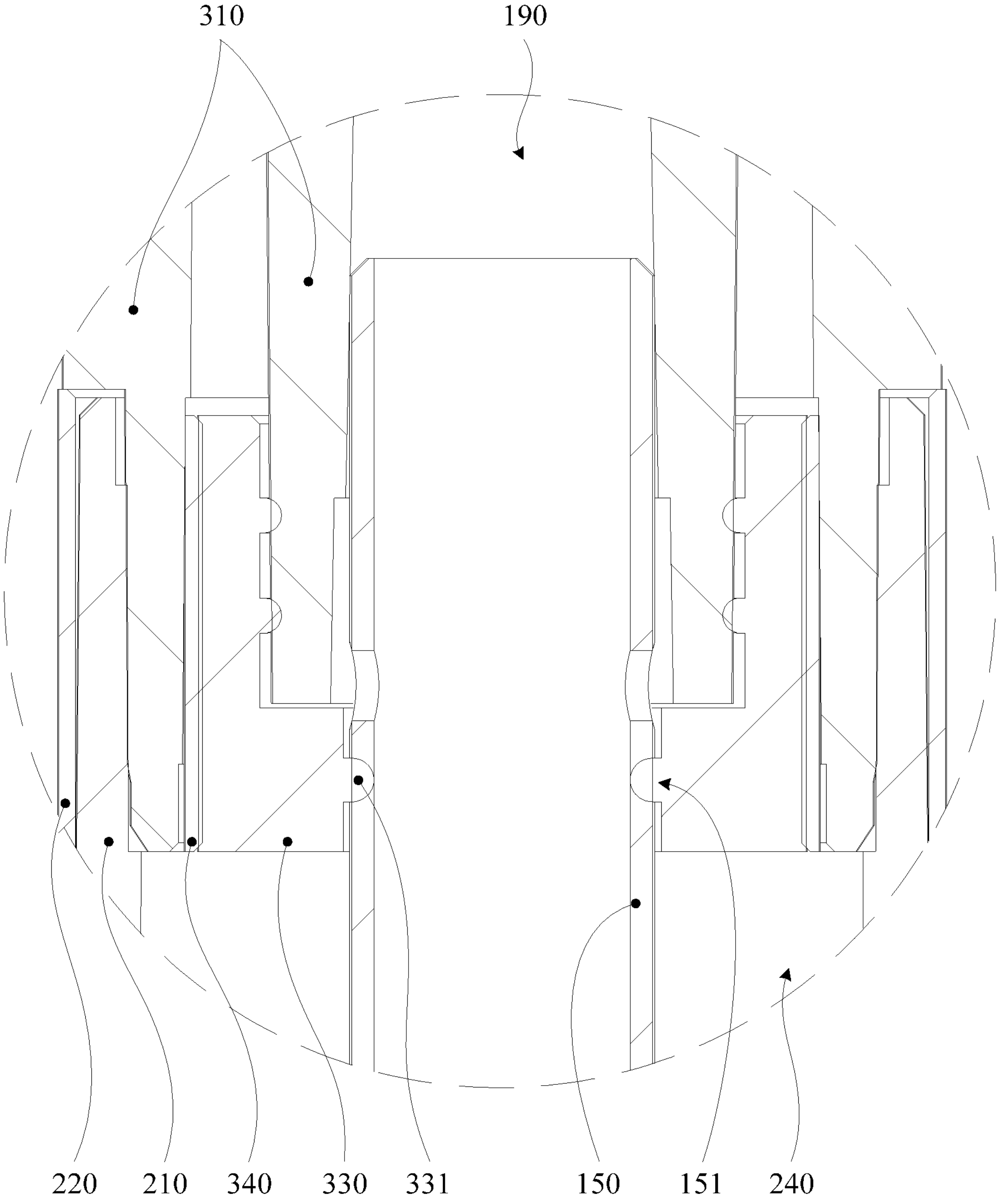
FIG. 13 is an enlarged schematic view of a part of the structure of the embodiment shown in FIG. 12.
Figure 15:
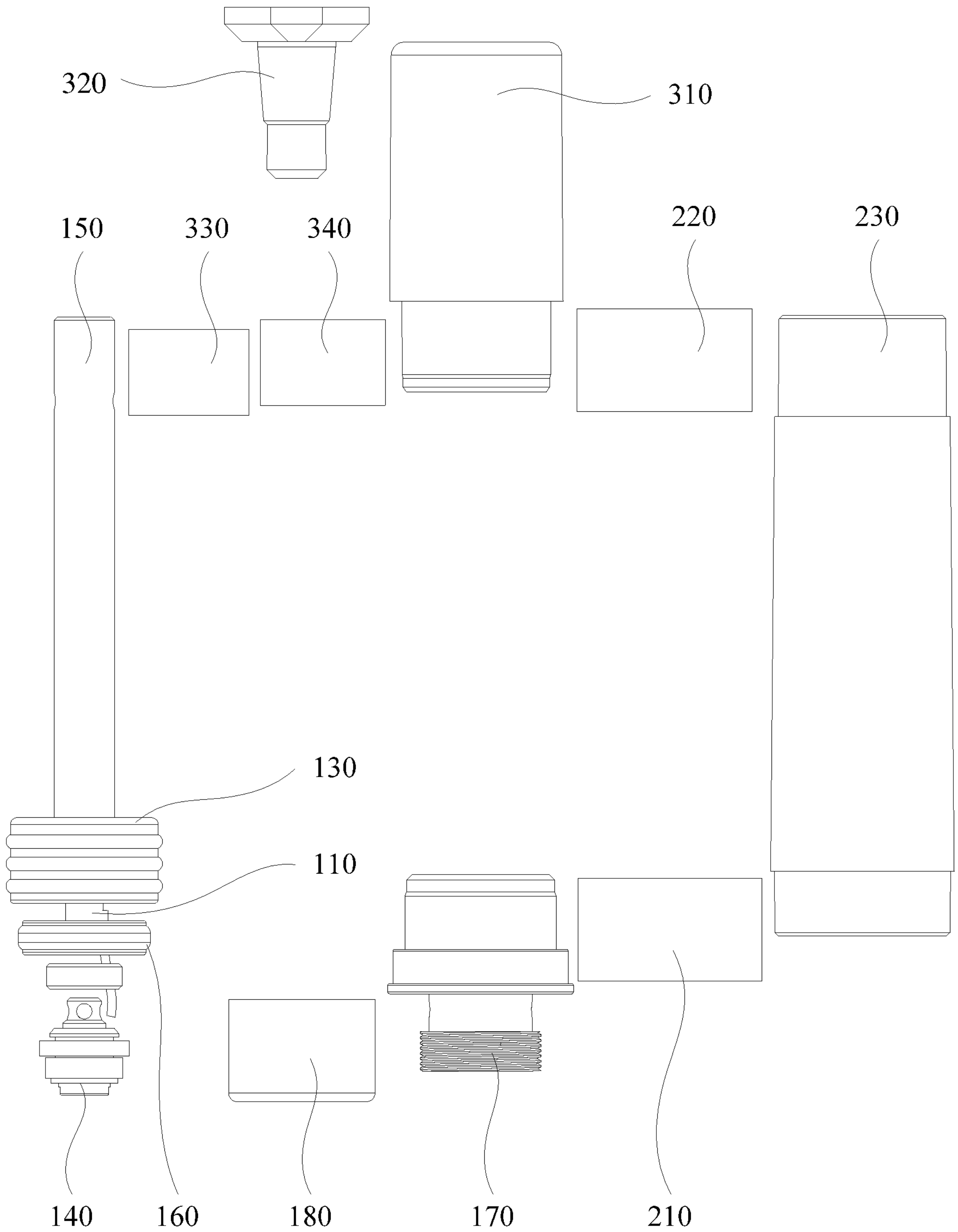
FIG. 15 is a schematic exploded view of the structure of the embodiment shown in FIG. 10.

In one of the embodiments, referring to FIG. 13, the ventilation tube 150 may be provided with a positioning groove 151, and the positioning groove 151 may be used for positioning and mounting of the suction nozzle structural member 300 or its suction nozzle sealing sleeve 330. Further, the suction nozzle sealing sleeve 330 may be provided with a positioning protrusion 331 that corresponds to the positioning groove 151, and the positioning protrusion 331 in the positioning groove 151 may be in close contact with the ventilation tube 150. In one aspect, it is beneficial to ensure mounting and positioning, and avoid mounting which may be too shallow or too deep. In another aspect, it is beneficial to ensure the sealing effect on the connection of the ventilation tube 150, and cooperate with other structures to jointly seal the liquid storing chamber 240 of the liquid-storing structural member 200. Further, Further, in this embodiment, referring to FIG. 15 and FIG. 16, the suction nozzle structural member 300 may be further provided with a suction nozzle inner tube 340, the suction nozzle sealing sleeve 330 and the suction nozzle 310 may be sleeved around the ventilation tube 150, the suction nozzle sealing sleeve 330 and the suction nozzle 310 may be respectively in contact with the ventilation tube 150, and the suction nozzle 310 may be located above the suction nozzle sealing sleeve 330, the suction nozzle inner tube 340 may be sleeved around the suction nozzle sealing sleeve 330; the suction nozzle 310 may have an interlayer, the suction nozzle sealing sleeve 330 and the suction nozzle inner tube 340 may be at least partially located in the interlayer, and the suction nozzle sealing sleeve 330 and the suction nozzle inner tube 340 may be located between the suction nozzle 310 and the ventilation tube 150; an extending end of the suction nozzle 310 may be located between the suction nozzle inner tube 340 and one end of the liquid storing structure 230, the second outer tube 220 may be located outside one end of the liquid storing structure 230, so that one end of the liquid storing structure 230 may match with the ventilation tube 150 through the second outer tube 220, the suction nozzle sealing sleeve 330 and the suction nozzle inner tube 340 may together tightly combine with the suction nozzle 310, i.e., the second outer tube 220, the liquid storing structure 230, the extending end of the suction nozzle 310, the suction nozzle inner tube 340, the suction nozzle sealing sleeve 330 and the other extending end of the suction nozzle 310 may be tightly sleeved on the outside of the ventilation tube 150 in sequence, wherein a portion of the suction nozzle sealing sleeve 330 may be directly sleeved on the outside of the ventilation tube 150. In one aspect, such a design is beneficial in that the air channel 190 can communicate with the ventilation tube 150 at the suction nozzle structural member 300 and its suction nozzle 310, in another aspect, it is beneficial in that it can seal the liquid storing chamber 240 of the liquid storing structure 230, and prevent the atomizing medium from being evaporated by heat or volatilizing at normal temperature, and escaping from the end connected to the suction nozzle structural member 300.

Figure 14:
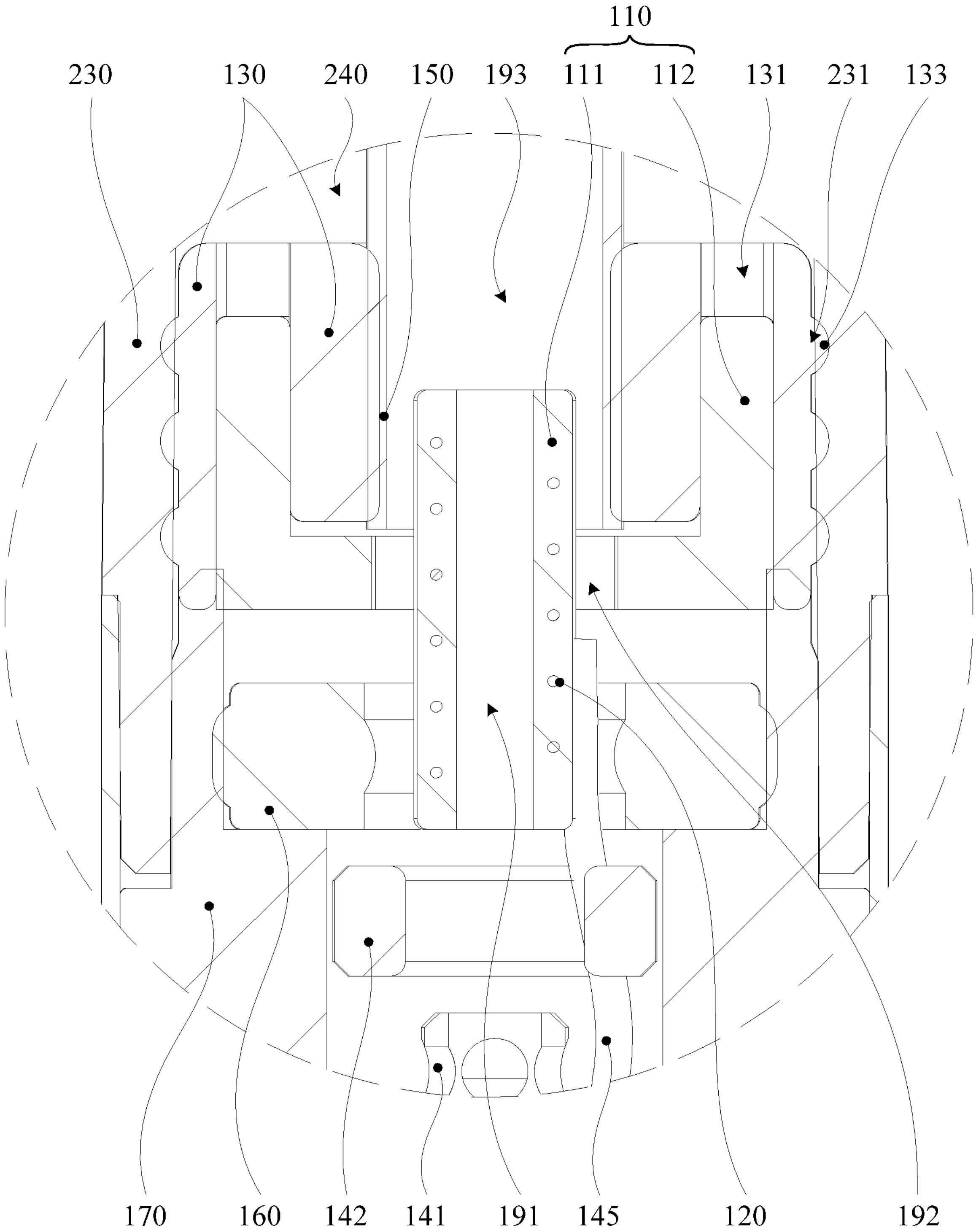
FIG. 14 is an enlarged schematic view of a part of the structure of the embodiment shown in FIG. 12.

In one of the embodiments, as shown in FIG. 14, the atomizing structural member 100 may further include a mounting member 160, and the mounting member 160 may cooperate with the base 170 to jointly fix the electrode assembly 140. Further, in this embodiment, the bottom of the mounting member 160 may cooperate with the top of the base 170 to jointly fix the electrode assembly 140 or one end of the insulating wiring tube 145. Further, the outer side of the mounting member 160 may abut against the base 170, and the inner side of the mounting member 160 may tightly abut against the atomizing portion 111, or the inner side of the mounting member 160 may tightly abut against the atomizing portion 111 and one end of the insulating wiring tube 145, so as to cooperate with the base 170, the liquid storing structure 230 and the first outer tube 210 in order to position and fix the atomizing portion 111 and the insulating wiring tube 145, this is also an implementation in which one end of the liquid storing structure 230 may be tightly combined with the atomizing structural member 100 through the first outer tube 210.

Figure 17:
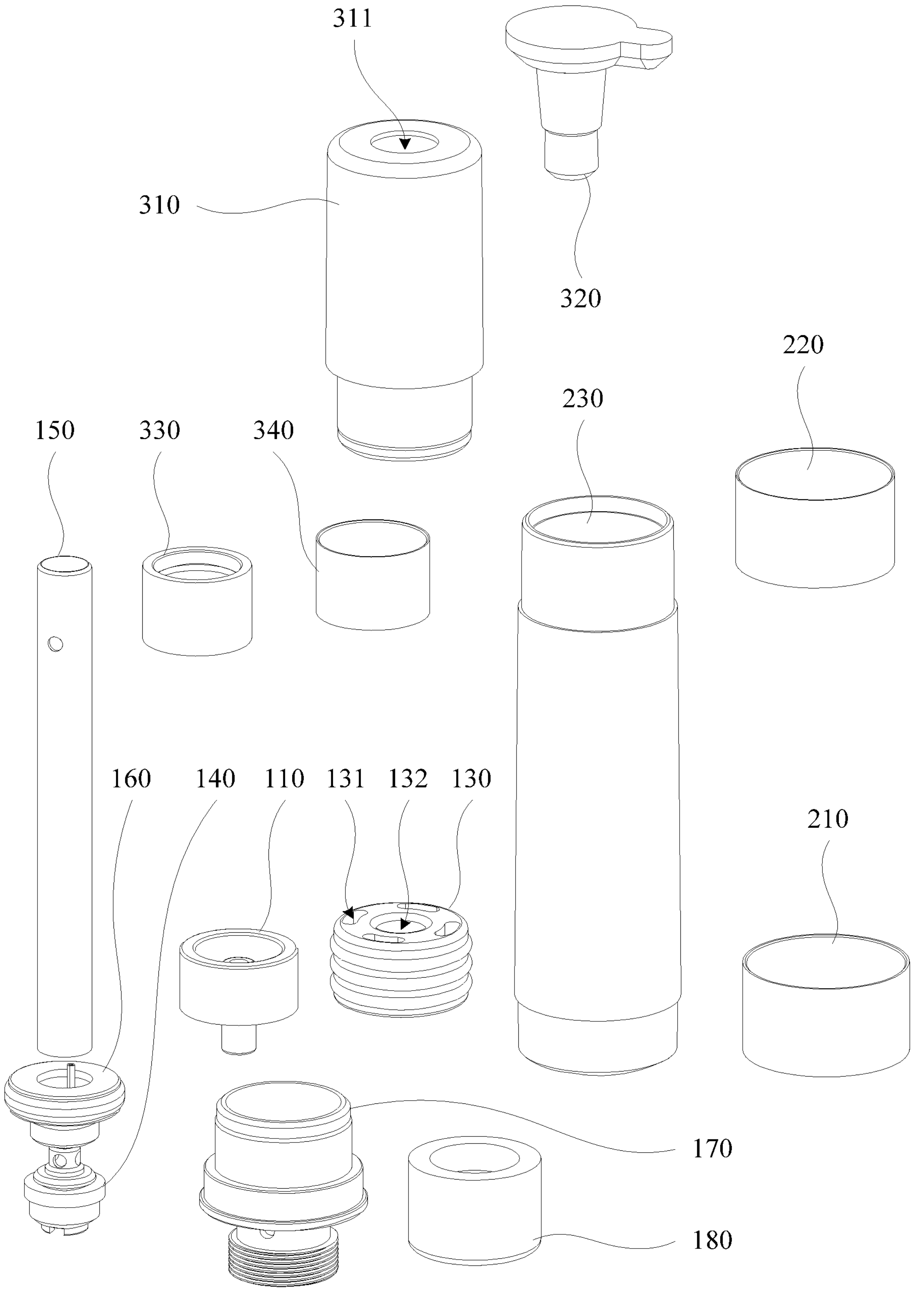
FIG. 17 is another schematic exploded view of the structure of the embodiment shown in FIG. 10.

In one of the embodiments, referring to FIG. 14 and FIG. 17, the atomizing structural member 100 may further include a sealing upper cover 130, the sealing upper cover 130 may be provided with a through hole 132 and at least one liquid inlet 131, and the sealing upper cover 130 can seal the liquid storing chamber 240. In one of the embodiments, the sealing upper cover 130 may seal the liquid storing chamber 240 by itself, or may cooperate with the suction nozzle structural member 300 to jointly seal the liquid storing chamber 240, so that the atomizing medium in the liquid storing chamber 240 may contact with the liquid guiding portion 112 only through the liquid inlet 131; the through hole 132 may be used for the passing through of the ventilation tube 150 of the atomizing structural member 100, i.e., the ventilation tube 150 passes through the through hole 132. Further, in one of the embodiments, referring to FIG. 19 and FIG. 20, the sealing upper cover 130 may be formed with an accommodating cavity 134, the liquid guiding portion 112 may be at least partially accommodated in the accommodating cavity 134, and the sealing upper cover 130 may seal the liquid storing chamber 240 so that the atomizing medium in the liquid storing chamber 240 may be in contact with the liquid guiding portion 112 or the liquid absorbing face 119 only through the liquid inlet 131.

Further, in this embodiment, the sealing upper cover 130 may be further provided with a sealing protrusion 133, and one end of the liquid storing structure 230 may be correspondingly provided with a sealing groove 231, and the sealing groove 231 may be used for coordinating the positioning and mounting of the sealing upper cover 130, the sealing protrusion 133 in the sealing groove 231 may tightly abut against the liquid storing structure 230, in one aspect, it is beneficial to ensure mounting and positioning, and avoid mounting which may be too shallow or too deep, and in another aspect, it is beneficial to ensure the sealing effect at the connection of the liquid storing structure 230, and coordinate together with other structures to seal the liquid storing chamber 240 of the liquid-storing structural member 200. For the sealing of the liquid storing chamber, it has always been the focus of the field, and the present application is no exception. Due to the design of the ventilation tube 150 passing through the liquid storing chamber 240, it is necessary to solve the problem of sealing both ends of the liquid storing structure 230 and the liquid storing chamber 240, in one aspect of the present application, through the sealing upper cover 130 of the atomizing structural member 100 and the base 170 in cooperation with the first outer tube 210 of the liquid-storing structural member 200, the two can be tightly combined, i.e., one end of the liquid storing structure 230 can be tightly combined with the atomizing structural member 100 through the first outer tube 210; in another aspect, the first outer tube 210 can apply pressure to the sealing upper cover 130 through one end of the liquid storing structure, so that it can tightly sleeve on the ventilation tube 150, and prevent the atomizing medium in the liquid storing chamber 240 from leaking into the second air channel 192, which is formed by the opening of the liquid guiding portion 112, through the gap between the ventilation tube 150 and the sealing upper cover 130, or leaking into the gap of the mounting region 113 of the atomizing core assembly 110. Such a design can effectively seal the end of the liquid storing structure 230 and the liquid storing chamber 240.

In one of the embodiments, referring to FIG. 17, the suction nozzle 310 of the suction nozzle structural member 300 may be provided with an opening 311, and referring to FIG. 10 and FIG. 12, the opening 311 may communicate with the air channel 190, the sealing plug 320 may detachably cover the opening 311 of the suction nozzle 310. With such a design, a user can conveniently use the atomizing device, and obtain the aerosol generated by the first atomizing face and the second atomizing face from the air channel 190 through the suction nozzle 310. In this embodiment, the opening 311 may be used as the air outlet.

Figure 18:
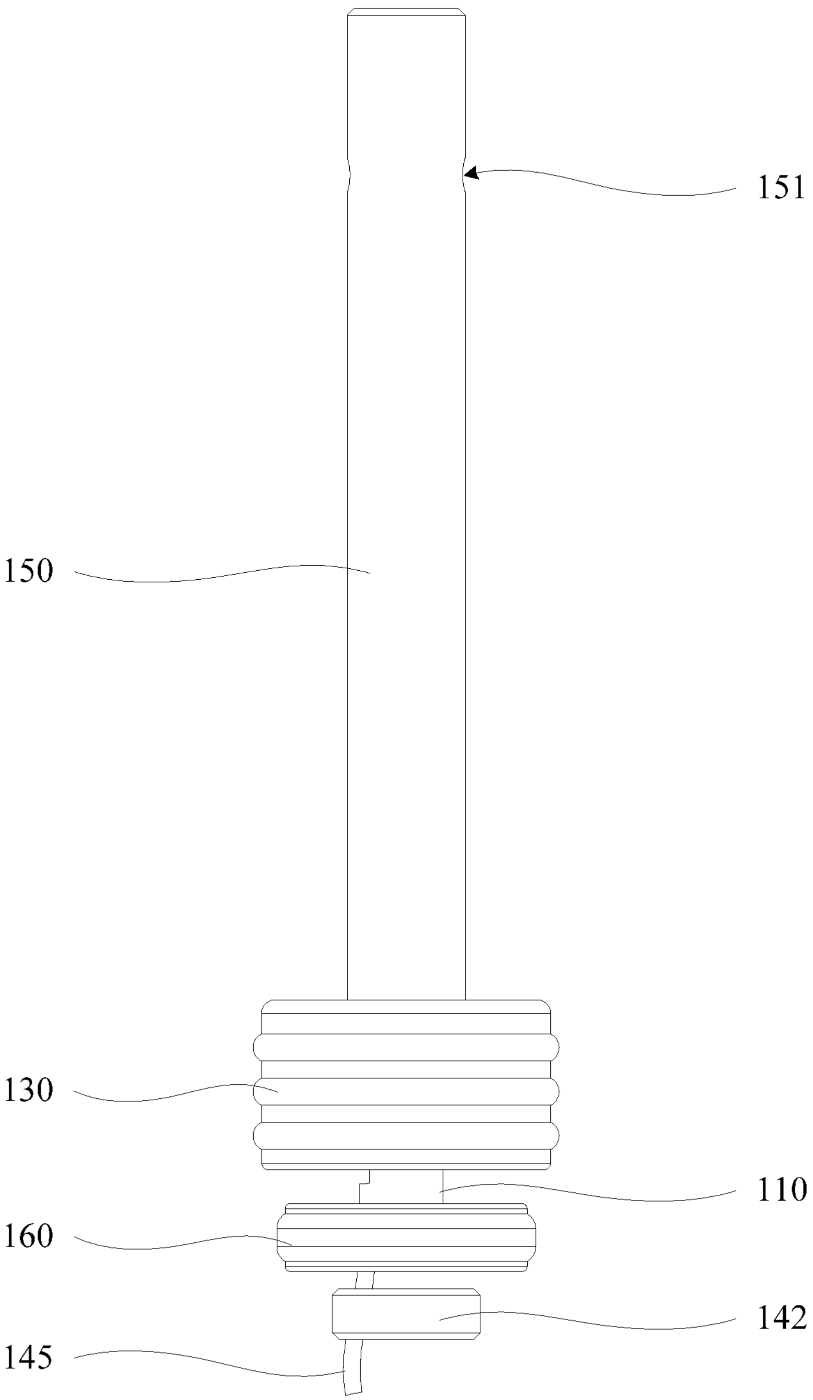
FIG. 18 is an enlarged schematic diagram of a part of the structure of the embodiment shown in FIG. 16.
Figure 19:
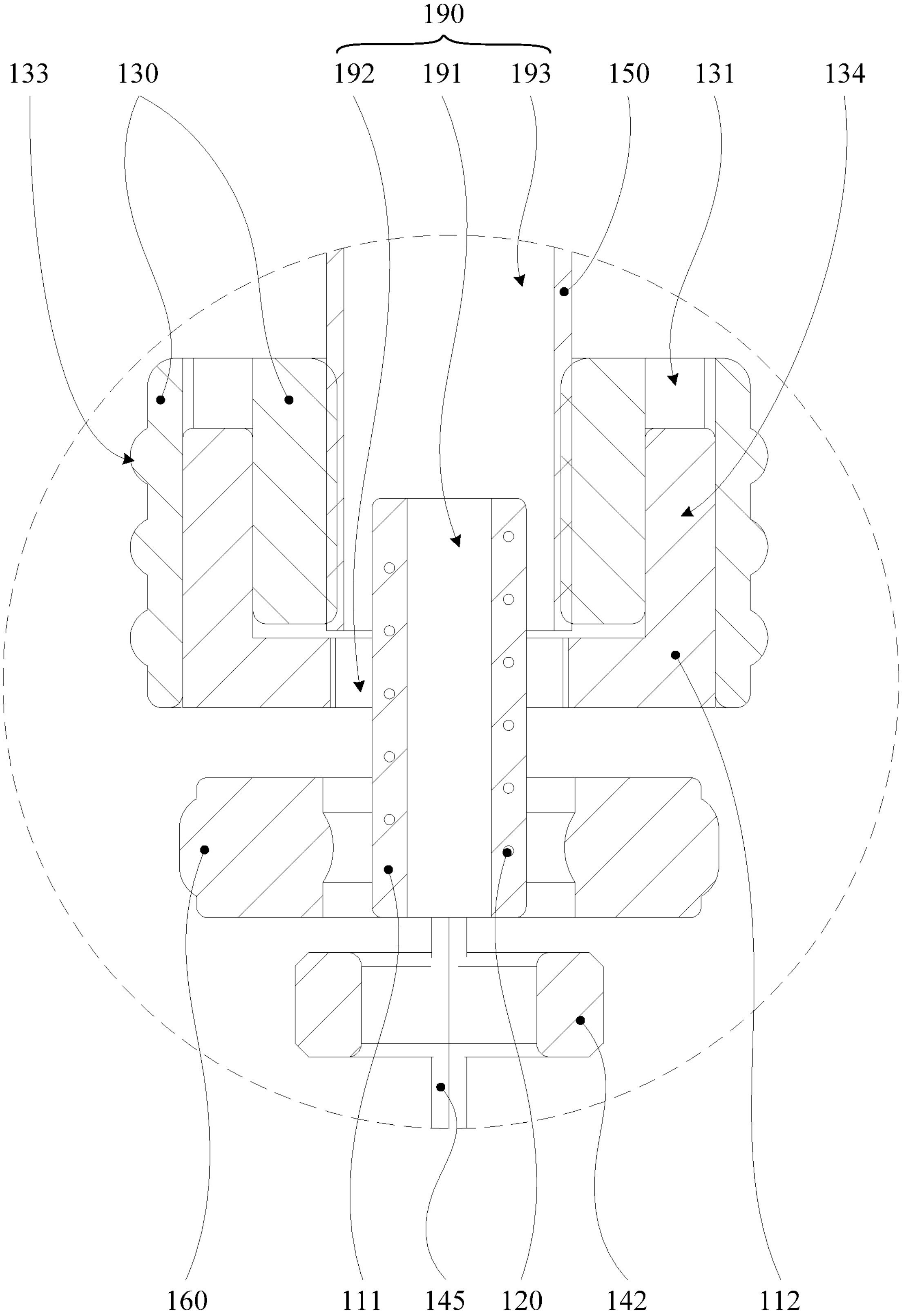
FIG. 19 is a schematic cross-sectional view of a part of the structure of the embodiment shown in FIG. 18.

Further, in one of the embodiments, the air channel may be communicated as shown in FIG. 18 and FIG. 19, the air channel 190 may include the first air channel 191, the second air channel 192 and the main air channel 193; the first air channel 191 and the second air channel 192 may both communicate with the main air channel 193 for output. Further, referring to FIG. 14, there may be a gap between the ventilation tube 150 and the atomizing portion 111, so that at least a portion of the second air channel 192 may be in fluid communication with the main air channel 193 through the gap; that is, the diameter of the ventilation tube 150 and the atomizing portion 111 are different, and the ventilation tube 150 and the atomizing portion 111 are not in contact with each other, so that a space is formed between the ventilation tube 150 and the atomizing portion 111 for communication with the second air channel 192 formed by the opening of the liquid guiding portion 112, the space is a portion of the main air channel 193, so that the main air channel 193 is communicating with the second air channel 192. This is an important invention point of the present application, through the two atomizing faces formed on the inner wall and outer wall of the atomizing portion 111, as well as the first air channel 191 and the second air channel 192, it has an advantage of generating a large amount of atomized aerosol.

Figure 21:
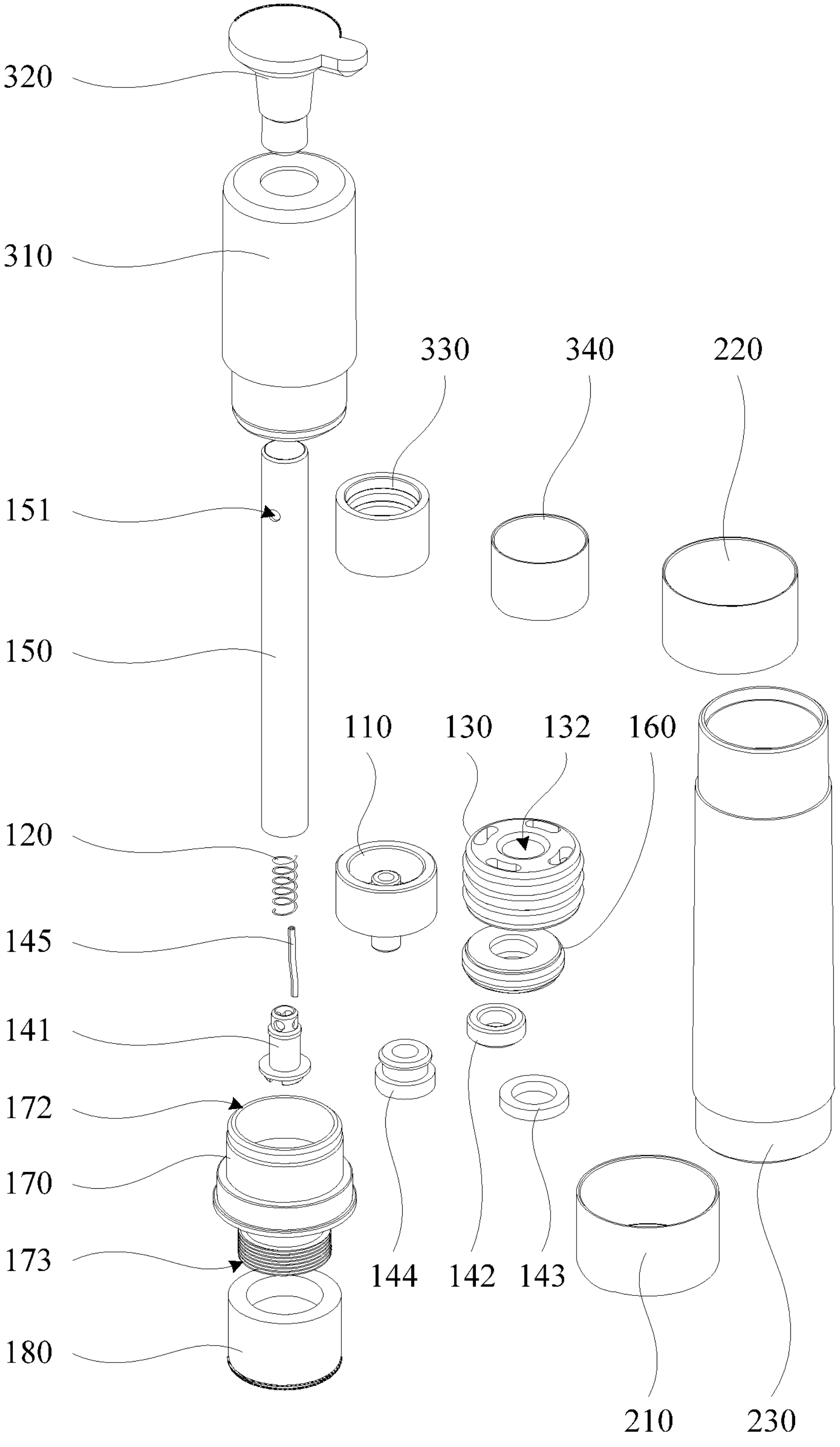
FIG. 21 is a schematic exploded view of the structure of the embodiment shown in FIG. 20 from another direction.
Figure 22:
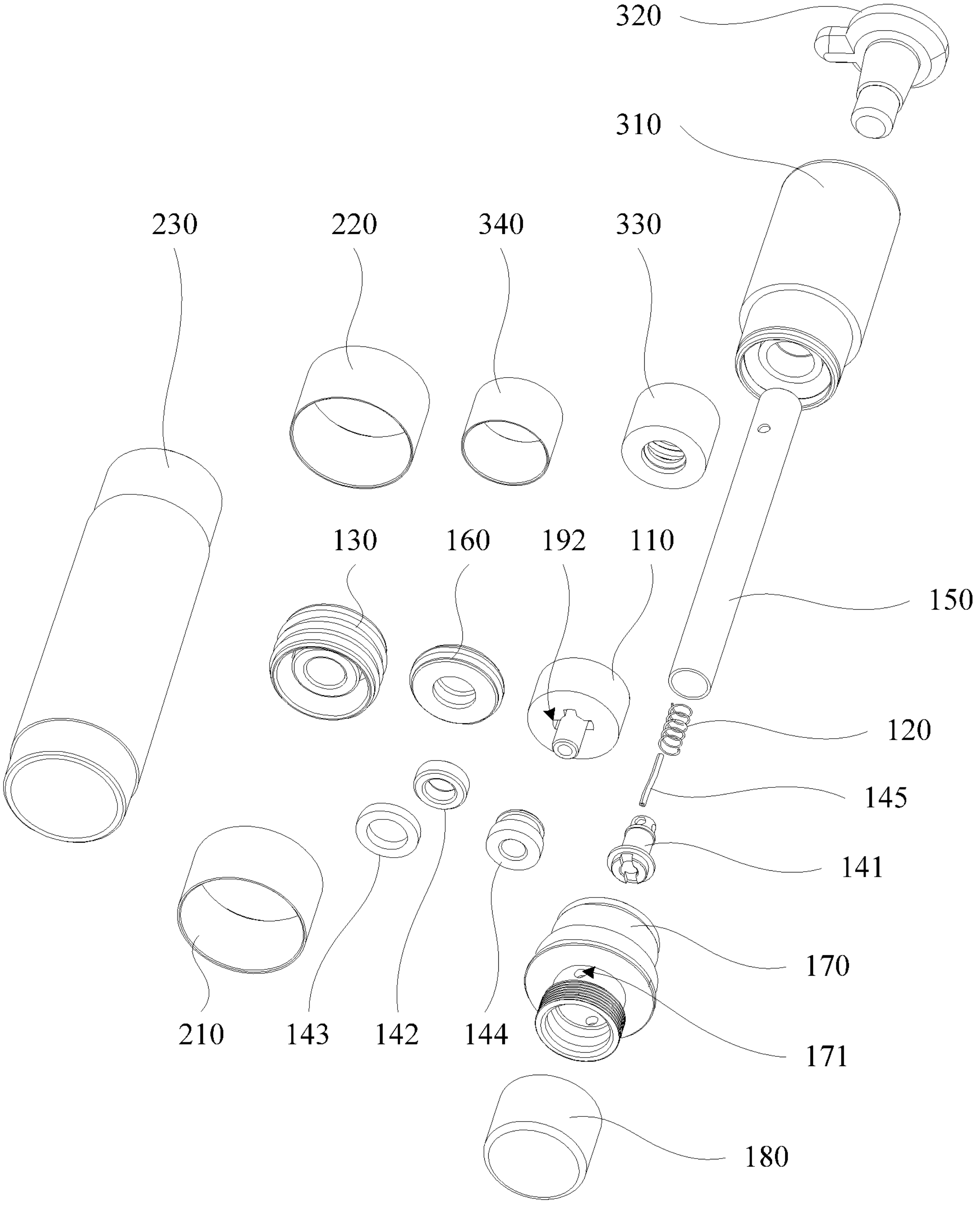
FIG. 22 is a schematic exploded view of the structure of the embodiment shown in FIG. 20 from another direction.

In one of the embodiments, as shown in FIG. 21, the heating element 120 may be in the shape of a spiral structure, and the sealing upper cover 130 may be provided with a through hole 132 through which the ventilation tube 150 can be inserted. The base 170 may have a connecting end 173 for thread connection. Further, in one of the embodiments, referring to FIG. 4 and FIG. 22, the second air channel 192 of the atomizing core assembly 110 may be jointly formed by the opening and the outer wall 115. Such a design facilitates the heating element 120 to indirectly contact with the opening through the outer wall 115, and directly form a second atomizing face on the outer wall 115 to deliver the generated aerosol.

Figure 23:
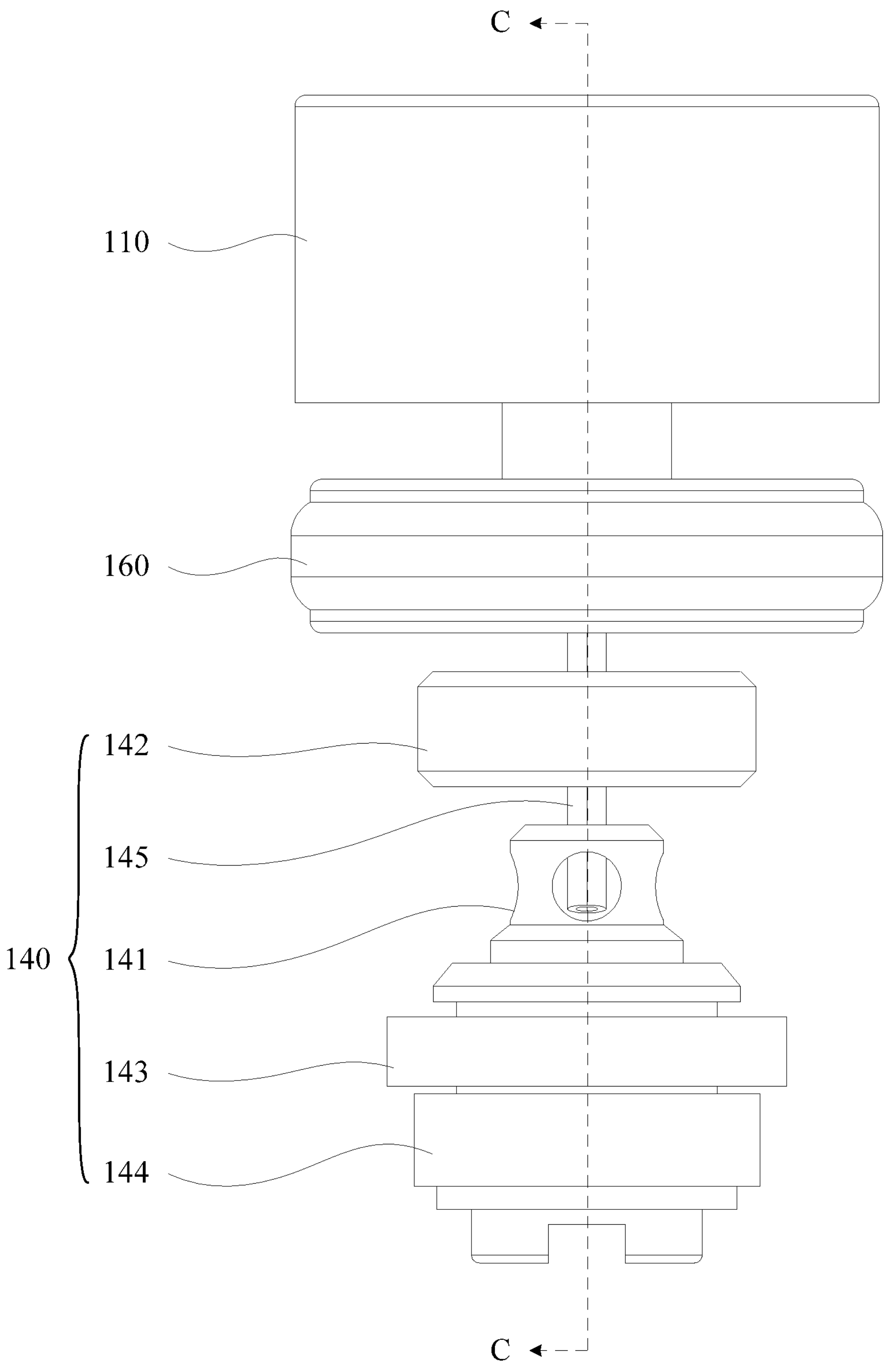
FIG. 23 is a partial structural schematic diagram of the atomizing device according to another embodiment in this application.
Figure 24:
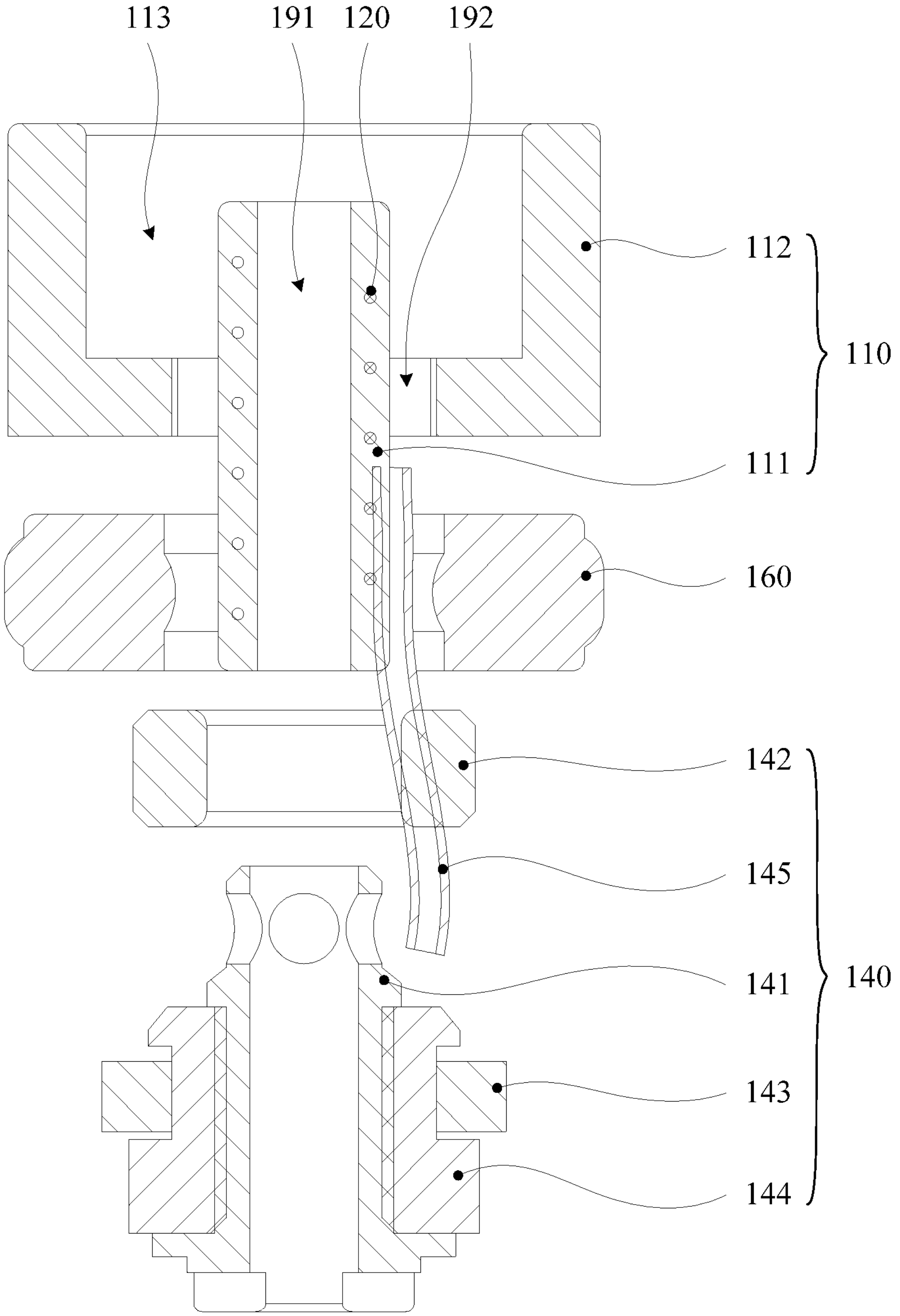
FIG. 24 is a schematic cross-sectional view along the C-C direction of the embodiment shown in FIG. 23.

In one of the embodiments, as shown in FIG. 23, the atomizing structural member 100 may further include an electrode assembly 140, the electrode assembly 140 may be connected to the heating element 120, and the electrode assembly 140 may be used for connecting to a power source; the electrode assembly 140 may include an electrode core 141, an electrode pressing piece 142, an electrode seat 143, an electrode sealing sleeve 144 and an insulating wiring tube 145, referring to FIG. 24, the electrode core 141 may be used for connecting to an electrode or a connector of the power source. In one of the embodiments, the electrode core 141 may be used to connect to the electrode or the connector of the power source by means of snap-fitting, screwing or plugging. The electrode pressing piece 142 may be in contact with the electrode core 141 or not in contact with the electrode core 141, and the electrode pressing piece 142 may be used for cooperating and pressing the insulating wiring tube 145; for example, the electrode pressing piece 142 may cooperate with the base 170 to jointly fix the insulating wiring tube 145. In this embodiment, a wire may be provided inside the insulating wiring tube 145 and an insulating layer may be provided on the outside of the insulating wiring tube 145, and the wire may be connected to the electrode core 141 and the heating element 120 so that power from the power source can heat the heating element 120 through the electrode core 141.

In one of the embodiments, referring to FIG. 12 and FIG. 24, the bottom of the electrode core 141 may be used to penetrate into the electrode or connector of the power source through the base 170, and the electrode sealing sleeve 144 may be sleeved outside the electrode core 141, for example, the electrode sealing sleeve 144 may be sleeved on the electrode core 141, or sleeved on the outer wall of the electrode core 141, i.e. the electrode sealing sleeve 144 may be sleeved on at least a portion of the outer wall of the electrode core 141, the electrode seat 143 may be sleeved on the outer wall of the electrode sealing sleeve 144, i.e., the electrode seat 143 may be sleeved on at least a portion of the outer wall of the electrode seal sleeve 144, the outer side of the electrode seat 143 may abut against the base 170 and cooperate with the base 170 for fixing the electrode sealing sleeve 144 and the electrode core 141. In such a design, apart from the portion of the electrode core 141 that may be exposed to the outside through the base 170 for connection with the electrode or connector of the power source, the remaining portion may be sealed and protected by the electrode seat 143 and the electrode sealing sleeve 144 in cooperation with the base 170, and at the same time it can protect the atomizing structural member 100 in the interior of the liquid-storing structural member 200, and especially the atomizing core assembly 110.

In one of the embodiments, referring to FIG. 1 to FIG. 24, an atomizing device may include the atomizing structural member 100, i.e., the atomizing core, the liquid-storing structural member 200 and the ventilation tube 150, wherein the liquid-storing structural member 200 may be used to store the atomizing medium, such as cigarette oil, essence, fragrance, etc.; the ventilation tube 150 may be used to deliver the aerosol generated by atomization for suction; the ventilation tube 150 may be in fluid communication with the first air channel 191, a gap may formed between the inner wall of the ventilation tube 150 and the outer wall 115 of the atomizing portion 111, and the gap may be at least partially in fluid communication with the second air channel 192, so that the aerosol generated from the second atomizing face can enter the ventilation tube 150 through the gap. In this embodiment, the atomizing device or its base 170 may be further provided with an air inlet 171, and the air inlet 171 may be in fluid communication with the atomizing core assembly 110 or the air channel 190 of the atomizing portion 111; in this embodiment, the air inlet 171 may be in fluid communication with the first air channel 191 and the second air channel 192, so as to provide air for the transfer of the generated aerosol during suction, and output through the ventilation tube 150. In one of the embodiments, the atomizing device or the atomizing structural member 100 may further include the sealing upper cover 130, the sealing upper cover 130 may be used for sealing the liquid storing chamber 240 of the liquid-storing structural member 200; the sealing upper cover 130 may be sleeved on the atomizing core assembly 110, and may be provided with at least one liquid inlet 131, and the liquid inlet 131 may communicate with the liquid absorbing face 119; the sealing upper cover 130 may also be provided with a through hole 132 through which the ventilation tube 150 can be inserted. The sealing upper cover 130 may accommodate the atomizing core assembly 110 and may be formed with the liquid inlet 131 for guiding the atomizing medium towards the liquid absorbing face 119, there may be one or more liquid inlets 131, i.e., there may be one or more corresponding liquid absorbing faces 119.

In one of the embodiments, an aerosol generating device may include the power source and the atomizing device according to any one of the above embodiments, the power source may be connected to the atomizing device for power supply. In one of the embodiments, the power source may have an electrode, and the electrode can be detachably connected to the electrode assembly 140 or the electrode core 141 of the electrode assembly 140.

It should be noted that other embodiments of the present application may also include atomizing structural members, atomizing devices, and aerosol generating devices that can be implemented by combining the technical features of the above embodiments.

The technical features of the above-described embodiments can be combined arbitrarily. For the sake of brevity, all possible combinations of the technical features in the above embodiments are not described. However, as long as there is no contradiction between the combinations of these technical features, all possible combinations should be regarded as the scope described in this specification.

The above-mentioned embodiments only represent several embodiments of the present application, and the descriptions thereof are relatively specific and detailed, but should not be construed as a limitation on the scope of the patent application. It should be pointed out that for those skilled in the art, without departing from the concept of the present application, other modifications and improvements can be made, which all belong to the scope of protection of the present application. Therefore, the scope of patent protection of the present application should be governed by the appended claims.

What is claimed is:

1. An atomizing structural member, comprising an atomizing core assembly and a heating element;

the atomizing core assembly comprising an atomizing portion and a liquid guiding portion, wherein the heating element is embedded in the atomizing portion, and the atomizing portion is an article of porous material;

the liquid guiding portion is arranged to be in contact with the atomizing portion, and the liquid guiding portion is used to deliver an atomizing medium to the atomizing portion;

the atomizing portion has an inner wall and an outer wall, the inner wall forms a first atomizing face and a first air channel, the outer wall forms a second atomizing face, and the liquid guiding portion is provided with at least one opening to form a second air channel.

2. The atomizing structural member according to claim 1, wherein the heating element is provided between the inner wall and the outer wall, and the heating element is spaced apart from both the inner wall and the outer wall.

3. The atomizing structural member according to claim 2, wherein the heating element is a resistance heating element.

4. The atomizing structural member according to claim 2, wherein the heating element comprises a spiral structure, cylindrical or a straight strip.

5. The atomizing structural member according to claim 2, wherein the heating element has a uniform shape, and the heating element is equally spaced apart from both the inner wall and the outer wall, so that the heating element has a uniform heating effect on the first atomizing face and the second atomizing face.

6. The atomizing structural member according to claim 1, wherein the liquid guiding portion and the atomizing portion are of an integral structure; and/or a contacting position of the liquid guiding portion and the atomizing portion is located in a central region of the outer wall, so that the atomizing medium is evenly delivered to both ends of the atomizing portion.

7. The atomizing structural member according to claim 1, wherein the at least one opening and the outer wall together form the second air channel.

8. The atomizing structural member according to claim 1, further comprising a ventilation tube, wherein a mounting region is formed between the atomizing portion and the liquid guiding portion, the ventilation tube is mounted to the mounting region and a gap is formed between an inner wall of the ventilation tube and the outer wall of the atomizing portion, a main air channel of the ventilation tube is in fluid communication with the first air channel, and the gap is at least partially in fluid communication with the second air channel.

9. The atomizing structural member according to claim 8, wherein the ventilation tube is provided with a positioning groove.

10. The atomizing structural member according to claim 1, wherein the liquid guiding portion is provided with a liquid absorbing face in contact with the atomizing medium, and the liquid absorbing face is used to deliver the atomizing medium to the atomizing portion through an interior of the liquid guiding portion.

11. An atomizing device, comprising a liquid-storing structural member and the atomizing structural member of claim 1;

wherein the liquid-storing structural member is provided with a liquid storing chamber for accommodating the atomizing medium, and the liquid guiding portion is arranged to be in contact with the atomizing medium in the liquid storing chamber;

wherein the atomizing structural member further comprises a sealing upper cover, the sealing upper cover is formed with a through hole and at least one liquid inlet, the sealing upper cover individually seals the liquid storing chamber or cooperates with a suction nozzle structural member to jointly seal the liquid storing chamber, so that the atomizing medium in the liquid storing chamber contacts the liquid guiding portion only through the liquid inlet, and the through hole is used for passing through of a ventilation tube of the atomizing structural member, wherein the atomizing structural member further comprises a base, a fixed end of the base abuts against the liquid-storing structural member and the sealing upper cover, so as to cooperate with mounting of the atomizing core assembly, a connecting end of the base is used for mounting of a power source; the base is formed with an air inlet, and the air inlet is in fluid communication with the first air channel and the second air channel.

12. The atomizing device according to claim 11, wherein the atomizing structural member further comprises an electrode assembly, the heating element is connected with the power source through the electrode assembly.

13. The atomizing device according to claim 12, wherein the atomizing structural member further comprises a mounting member, and the mounting member cooperates with the base to jointly fix the electrode assembly.

14. The atomizing device according to claim 11, wherein the atomizing device further comprises a suction nozzle structural member, the atomizing structural member further comprises a ventilation tube, a mounting region is formed between the atomizing portion and the liquid guiding portion, the ventilation tube is mounted to the mounting region and a gap is formed between an inner wall of the ventilation tube and the outer wall of the atomizing portion, a main air channel of the ventilation tube is in fluid communication with the first air channel, and the gap is at least partially in fluid communication with the second air channel, the ventilation tube is provided with a positioning groove, the suction nozzle structural member is provided with a positioning protrusion that corresponds to the positioning groove, the suction nozzle structural member is in fluid communication with the main air channel of the ventilation tube of the atomizing structural member.

15. An aerosol generating device, comprising the power source and the atomizing device of claim 11, wherein the power source is connected with the atomizing device for power supply.

* * * * *